US006852262B2

(12) United States Patent
Brown, Jr. et al.

(10) Patent No.: US 6,852,262 B2
(45) Date of Patent: Feb. 8, 2005

(54) INSERT MOLDING RAZOR CARTRIDGES

(75) Inventors: William R. Brown, Jr., Peabody, MA (US); William C. Carson, Acton, MA (US); Alexander T. Chenvainu, Brookline, MA (US); Thomas A. Christman, Lexington, MA (US); Kenneth E. Johnson, Hollis, NH (US); Charles P. Kiricoples, Salem, MA (US); Alejandro Lee, Cambridge, MA (US); Cardy J. Louis, Raynham, MA (US); Helge Zimmet, Waltham, MA (US)

(73) Assignee: The Gillette Company, Boston, MA (US)

(*) Notice: Subject to any disclaimer, the term of this patent is extended or adjusted under 35 U.S.C. 154(b) by 391 days.

(21) Appl. No.: 10/142,123

(22) Filed: May 9, 2002

(65) Prior Publication Data

US 2003/0209829 A1 Nov. 13, 2003

(51) Int. Cl.[7] ............................. B29D 5/00; B28B 7/22; B28B 5/00; B29B 13/00
(52) U.S. Cl. ..................... 264/252; 264/239; 264/241; 264/250; 264/255; 264/259; 264/271.1; 264/275; 264/279
(58) Field of Search ................................ 264/239, 241, 264/250, 252, 255, 259, 271.1, 275, 279

(56) References Cited

U.S. PATENT DOCUMENTS

| 4,378,634 A | 4/1983 | Jacobson |
| 4,489,627 A | 12/1984 | Lembke |
| 4,690,018 A | 9/1987 | Duncan |
| 4,852,254 A | 8/1989 | Duncan |
| 5,053,178 A | 10/1991 | Butlin et al. |
| 5,074,042 A | 12/1991 | Althaus et al. |

(List continued on next page.)

FOREIGN PATENT DOCUMENTS

| DE | G 93 06 942.1 | 9/1993 |

(List continued on next page.)

*Primary Examiner*—Stephen J. Lechert, Jr.
(74) *Attorney, Agent, or Firm*—Fish & Richardson P.C.

(57) ABSTRACT

Methods of manufacturing razor cartridges are provided. One method includes loading a support portion of a supported blade into an elongated blade slot defined by a core member, the core member being configured to define a portion of a molding cavity defining the shape of the cartridge housing; and delivering a resin to the molding cavity to form the housing and capture a portion of the blade in the resin. In another method, a plurality of razor cartridges are manufactured substantially simultaneously by (a) removably mounting each blade on a core member; (b) placing each core member in a molding cavity; and (c) delivering a resin to the molding cavities to form at least a portion of the cartridge housing and capture a portion of the blade in the resin. In other methods a flexible region is provided adjacent the blade ends by: (a) delivering a compliant material to the molding cavity to capture at least the ends of the blade; (b) placing the blade and molded compliant material in a second molding cavity defining the shape of the molded housing; and (c) delivering a resin to the second molding cavity to form the molded housing, or by (a) providing coring areas in the molding cavity beyond each of the blade ends, configured to provide a flexible region of plastic adjacent each blade end in the finished product; and (b) delivering a resin to the molding cavity. In some methods, the resin is delivered through a gate that is positioned so that a substantial portion of the resin flow goes by the blade ends before the molding cavity is filled.

30 Claims, 23 Drawing Sheets

U.S. PATENT DOCUMENTS

| | | |
|---|---|---|
| 5,084,969 A | 2/1992 | Althaus |
| 5,090,124 A | 2/1992 | Althaus |
| 5,104,605 A | 4/1992 | Butlin et al. |
| 5,113,585 A | 5/1992 | Rogers et al. |
| 5,141,694 A | 8/1992 | Butlin et al. |
| 5,185,927 A | 2/1993 | Rivers |
| 5,191,712 A | 3/1993 | Crook et al. |
| 5,301,425 A | 4/1994 | Ferraro |
| 5,313,705 A | 5/1994 | Rivers et al. |
| 5,318,429 A | 6/1994 | Butlin et al. |
| 5,343,622 A | 9/1994 | Andrews |
| 5,345,680 A | 9/1994 | Vreeland et al. |
| 5,369,885 A | 12/1994 | Ferraro |
| 5,410,810 A | 5/1995 | Gillibrand |
| 5,454,164 A | 10/1995 | Yin et al. |
| 5,475,923 A | 12/1995 | Ferraro |
| 5,546,660 A | 8/1996 | Burout et al. |
| 5,557,851 A | 9/1996 | Ortiz |
| 5,666,729 A | 9/1997 | Ferraro |
| 5,689,883 A | 11/1997 | Ortiz et al. |
| 5,781,997 A | 7/1998 | Ferraro et al. |
| 5,822,862 A | 10/1998 | Ferraro |
| 6,009,624 A | 1/2000 | Apprille, Jr. et al. |
| 6,035,535 A | 3/2000 | Dischler |
| 6,550,141 B1 * | 4/2003 | Rivers et al. ............ 30/50 |

FOREIGN PATENT DOCUMENTS

| | | |
|---|---|---|
| DE | 199 49 851 A1 | 4/2001 |
| EP | 0 288 301 B1 | 10/1988 |
| EP | 0 288 301 A2 | 10/1988 |
| EP | 0 348 627 B1 | 1/1990 |
| EP | 0 348 627 A1 | 1/1990 |
| EP | 0 416 233 A1 | 3/1991 |
| EP | 0 462 807 A1 | 12/1991 |
| EP | 0 470 720 A1 | 2/1992 |
| EP | 0 667 813 B1 | 8/1995 |
| EP | 109253 A1 | 4/2001 |
| GB | 2 264 888 A | 9/1993 |
| WO | WO 94/11163 | 5/1994 |
| WO | WO 95/05272 | 2/1995 |

* cited by examiner

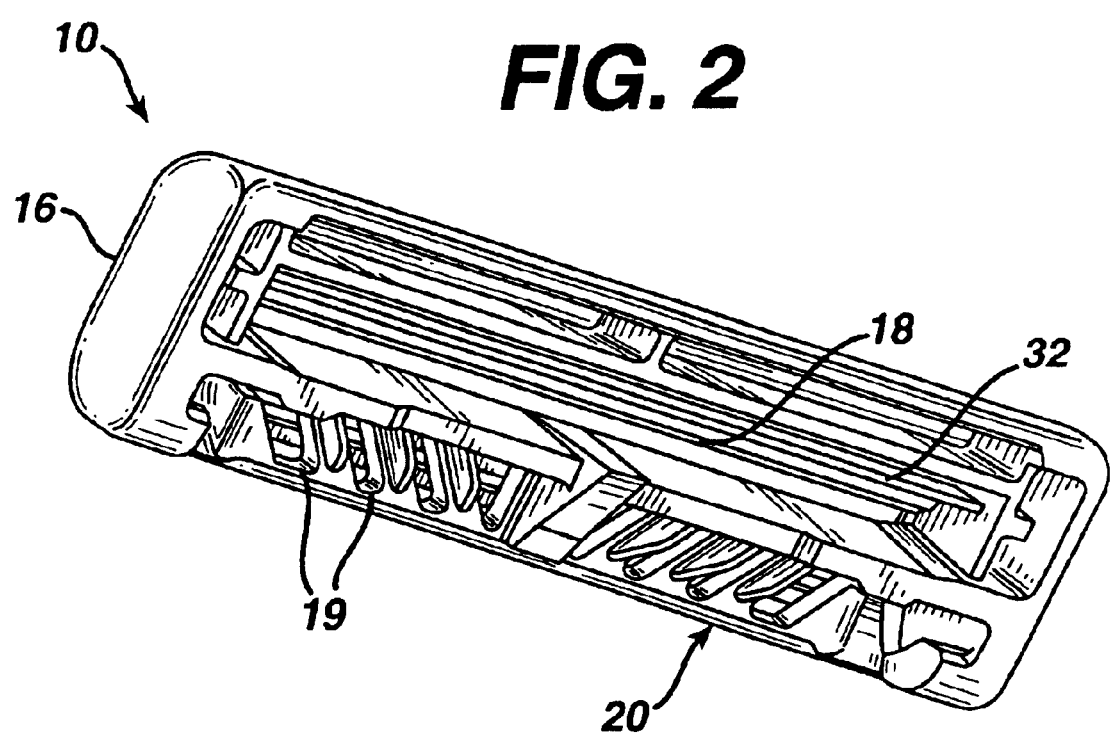

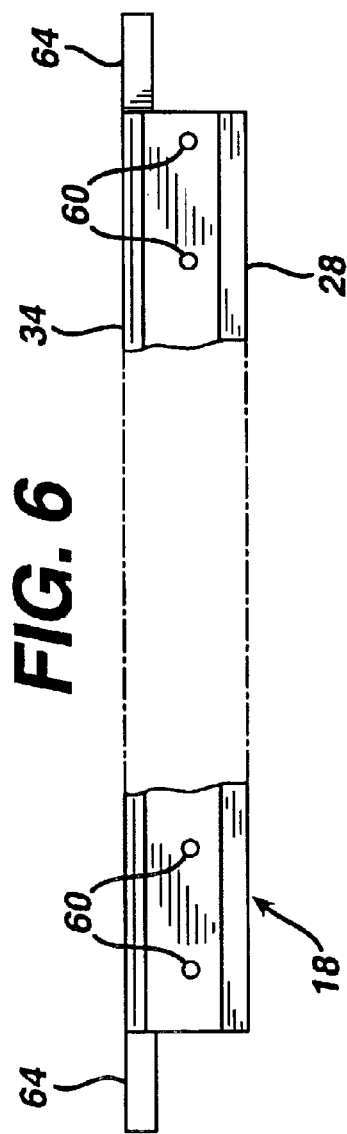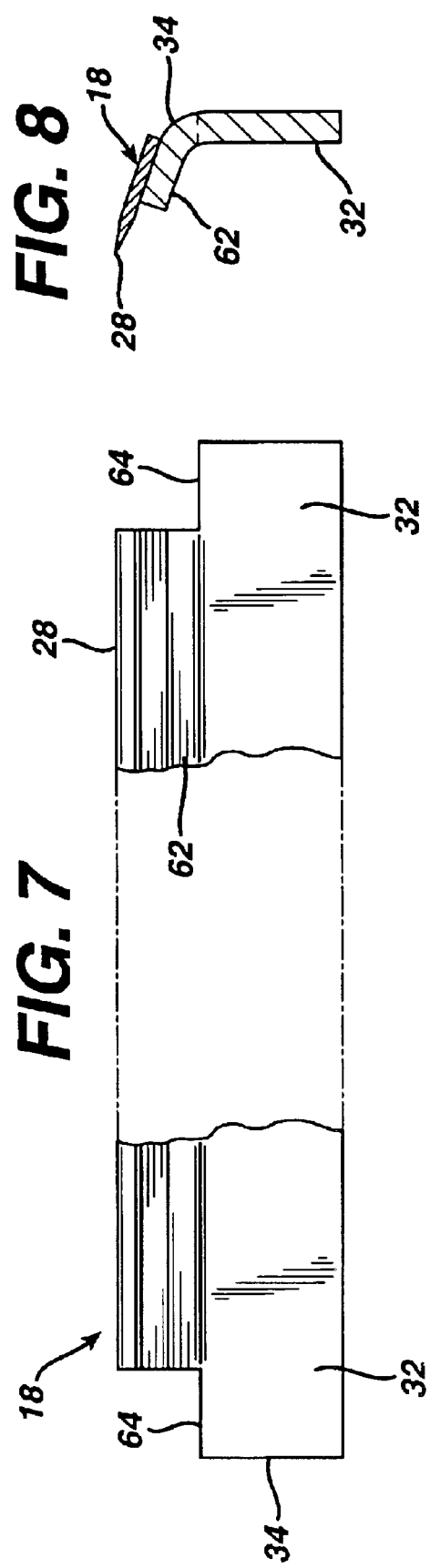

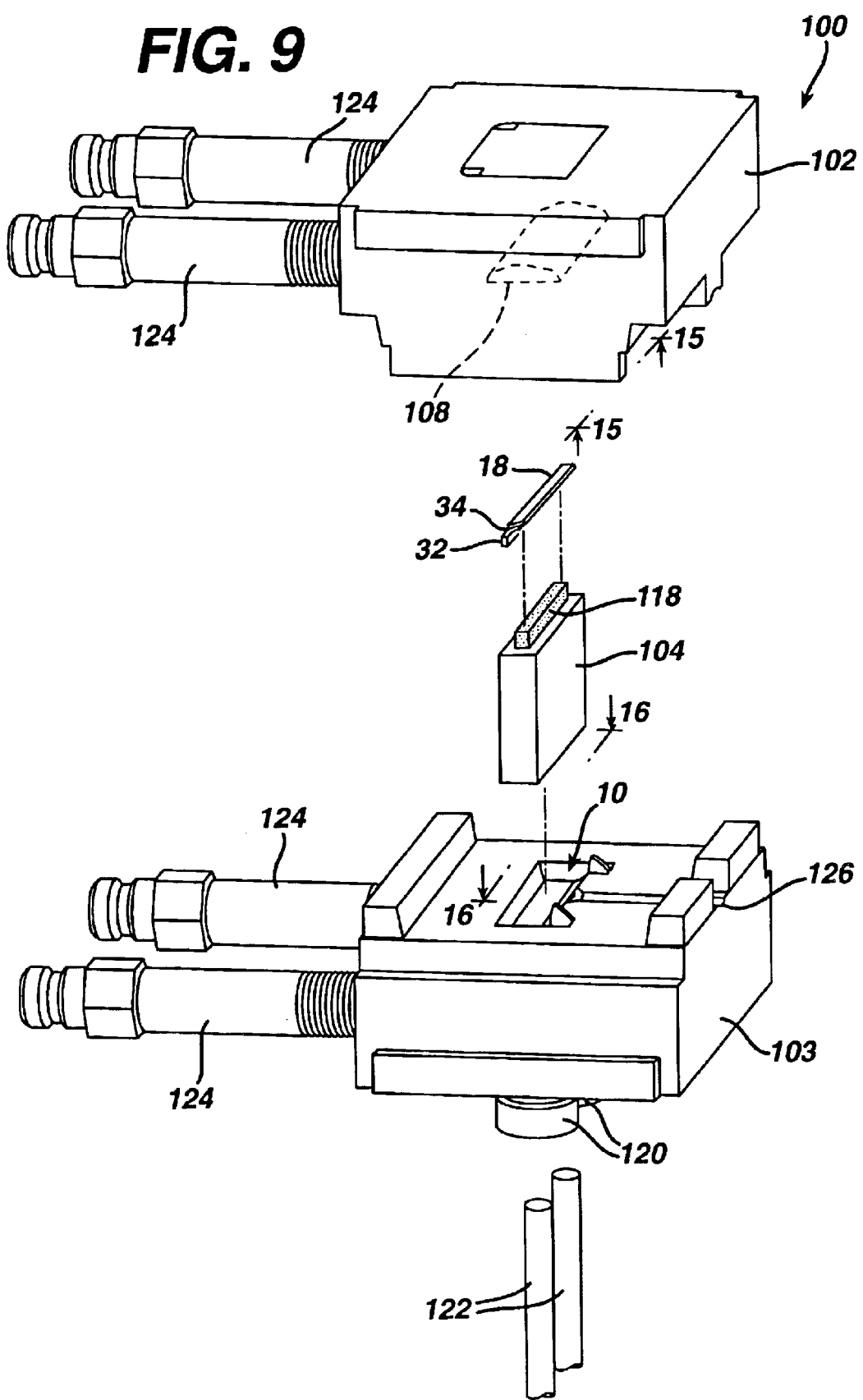

FIG. 11
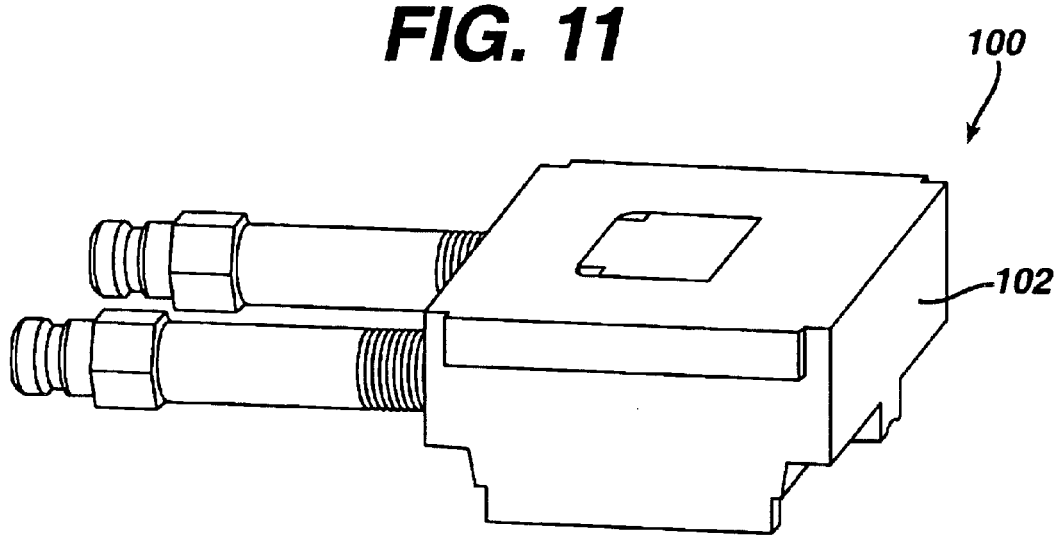
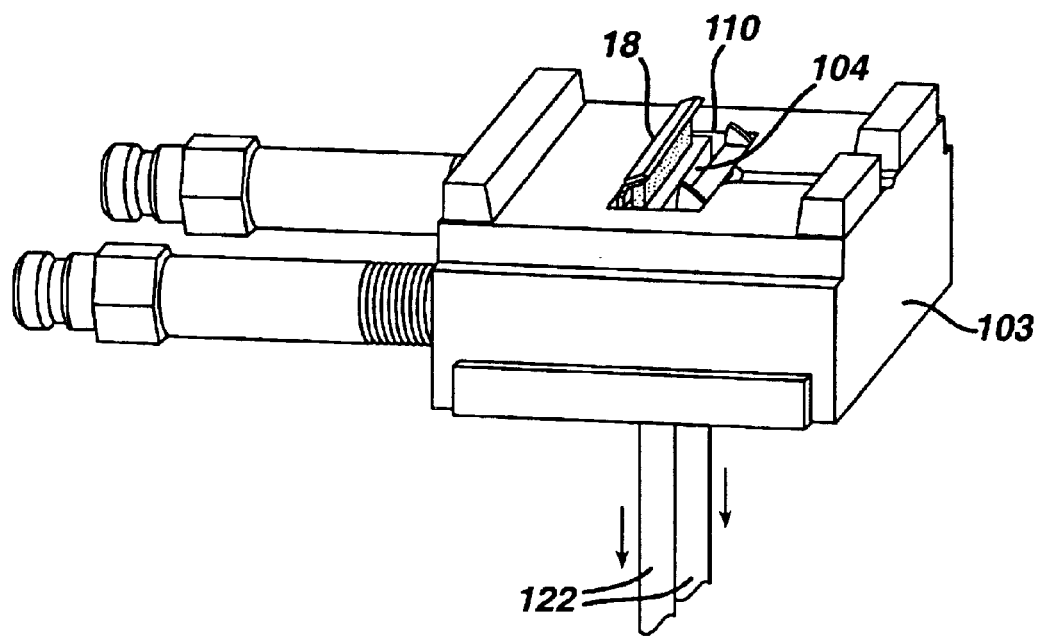

INSERT MOLDING RAZOR CARTRIDGES

TECHNICAL FIELD

This invention relates to methods and devices for manufacturing razor cartridges using insert molding.

BACKGROUND

Razor blades have been mounted in shaving systems for wet shaving using a variety of techniques. Many shaving systems include flexible blades, which require support along their length.

As an example, some support shaving systems containing flexible blades are manufactured by sandwiching a blade, having perforations extending along its length, between two layers of plastic. The blade is then secured in place, e.g., by riveting the blade through the perforations. One of the functions of this method of construction is to provide rigid support for the flexible blade. For those razors manufactured by this method containing a plurality of blades, a supporting spacer between each of the blades is generally necessary.

Flexible blades have also been supported by insert molding the plastic of the razor or razor cartridge around the longitudinal edge of the blade that is opposite the cutting edge, for example as described in U.S. Pat. No. 5,053,178. Typically, most or all of the unsharpened edge of the blade is captured by the molded plastic, and a support structure is integrally molded into the cartridge housing to provide support along the length of the blade. In those systems which are designed to allow the blade to flex, the support structure may be corrugated to allow the cartridge body and blade to bend simultaneously while providing intermittently spaced support to the blade. An integral guard is often molded as a feature of the cartridge to protect the skin.

Other types of shaving systems include supported (relatively inflexible) blades that are captured only at their ends and are allowed to move, during shaving, in a direction generally perpendicular to the length of the blade. A razor cartridge having a movable, supported blade is shown, for example, in U.S. Pat. No. 4,378,634. In this cartridge, each blade is attached to a bent blade support having upper portions that support the blades at a desired angle and lower base portions that are bent with respect to the upper portions. The bent blade supports are generally made from sheet metal that has been stamped and bent. (Such blades and blade supports are shown in FIGS. 6–8 herein.) The lower base portions of the bent blade supports extend to the sides beyond the upper bent portions and the blades. The lower base portions slide up and down in slots in a cartridge housing while the upper portion rests against resilient arms during shaving. The slots of the cartridge housing have back stop portions and front stop portions that define, between them, the region in which the blade supports can move forward and backward as they slide up and down in the slots during shaving. The front stop portions are beyond the ends of the blade, so as not to interfere with movement of the blade.

U.S. Pat. No. 5,369,885 describes insert molded dynamic shaving systems, i.e., shaving systems in which the blades are allowed to move in a direction generally perpendicular to the length of the blade. In one embodiment, shown in FIG. 6, a supported blade is captured at its ends by insert molding, and is dynamically mounted in a razor cartridge by vertical return springs 30.

SUMMARY

In general, the invention features methods and devices for manufacturing razor cartridges. Preferred razor cartridges include a supported blade.

Razor cartridges manufactured using methods and devices of the invention provide good shaving performance, can be manufactured at a relatively low cost, and have a simple design that is easy to assemble. The simplicity of the design tends to reduce product inconsistency that can result from the stack-up of tolerances in more complicated designs. Preferred methods allow the shaving systems to be manufactured economically, while minimizing or even eliminating blade damage that could reduce shaving performance. In some implementations, very consistent blade geometry can be obtained from cartridge to cartridge, resulting in enhanced shaving performance.

In one aspect, the invention features a method of manufacturing a razor cartridge including a molded housing and a supported blade mounted in the housing, including: (a) loading a support portion of the supported blade into an elongated blade slot defined by a core member, the core member being configured to define a portion of a molding cavity, mold surfaces of the molding cavity defining the shape of the housing; and (b) delivering a resin to the molding cavity to form the housing and capture a portion of the blade in the resin.

Some implementations of this aspect of the invention include one or more of the following features. The blade slot includes a lead-in area configured to facilitate loading of the blade into the blade slot. The resin-delivering step comprises capturing the ends of the blade in plastic. The lead-in area comprises angled regions on the sides of the blade slot. The lead-in area further comprises angled regions on the ends of the blade slot. The lead-in area, when viewed from above the blade slot, has a generally bowed shape to accommodate bowing of the blade. The blade slot includes a lower portion having substantially vertical sides, configured to position the blade. The delivering step comprises delivering a plurality of resins to the molding cavity, each resin forming a portion of the housing. At least one of the resins comprises a compliant material. The method further includes retaining the blade support in the blade slot by a retention means selected from the group consisting of vacuum, magnetic, and mechanical means. The method further includes delivering the supported blade to the blade slot using a vacuum transfer device. The method further includes providing clearance areas in the molding cavity, configured so that the mold surfaces will not contact an edge portion of the supported blade in shaving areas of the blade. The method further includes providing contact areas in the molding cavity, configured so that the mold surfaces will close on the supported blade in non-shaving areas adjacent the ends of the blade, inboard of the blade ends. The method further includes providing coring areas in the molding cavity beyond each of the blade ends, configured to provide a flexible region of plastic adjacent each blade end in the finished product. The core member is removable from the molding cavity. The method further includes inserting the core member into the molding cavity. The supported blade is loaded into the core member prior to insertion of the core member into the molding cavity. The cartridge includes a plurality of blades, and the core member defines a corresponding number of elongated blade slots.

In another aspect, the invention features a method of manufacturing a plurality of razor cartridges substantially simultaneously, each cartridge including a molded housing and a blade mounted in the housing, including: (a) removably mounting each blade on a core member; (b) placing each core member in a molding cavity; and (c) delivering a resin to the molding cavities to form at least a portion of the housing and capture a portion of the blade in the resin.

Some implementations of this aspect of the invention include one or more of the Following features. Step (a) is performed at a first station and steps (b) and (c) are performed at a second station. The method further includes placing each core member in a molding cavity at a third station and delivering a second resin to the molding cavity to form a second portion of the housing. At least one of the resin and the second resin is a compliant material. Each cartridge includes a plurality of blades, and step (a) includes mounting the plurality of blades on a single core member.

In another aspect, the invention features a method of manufacturing a razor cartridge including a molded housing and a blade mounted in the housing, including: (a) loading the blade into a molding cavity; (b) delivering a compliant material to the molding cavity to capture at least the ends of the blade in the resin; (c) placing the blade and molded compliant material in a second molding cavity, the second molding cavity defining the shape of the molded housing; and (d) delivering a resin to the second molding cavity to form the molded housing.

In a further aspect, the invention features a method of manufacturing a razor cartridge including a molded housing and a supported blade mounted in the housing, including: (a) loading the supported blade into a molding cavity, mold surfaces of the molding cavity defining the shape of the housing; (b) providing coring areas in the molding cavity beyond each of the blade ends, configured to provide a flexible region of plastic adjacent each blade end in the finished product; and (c) delivering a resin to the molding cavity to form the housing and capture the ends of the blade in the resin.

In yet another aspect, the invention features a method of manufacturing a razor cartridge including a molded housing and a supported blade mounted in the housing, including: (a) loading the supported blade into a molding cavity, the supported blade having blade ends, mold surfaces of the molding cavity defining the shape of the housing; and (b) delivering a resin to the molding cavity to form the housing and capture the ends of the blade in the resin; wherein the resin is delivered through a gate that is positioned so that a substantial portion of the resin flow goes by the blade ends before the molding cavity is filled.

In some implementations, the gate may be substantially centrally positioned in the molding cavity in the direction of the length of the blade.

The term "supported blade," as used herein, refers to a blade assembly (e.g., a blade mounted on a bent reinforcing support) or other structure (e.g., a blade bent along its length to provide stiffness to the blade) having sufficient stiffness to allow the supported blade to provide acceptable shaving performance in a shaving system in which the supported blade is mounted at its ends and a portion of a shaving area of the shaving edge is substantially unsupported by the shaving system housing.

Other features and advantages of the invention will be apparent from the description and drawings, and from the claims.

DESCRIPTION OF DRAWINGS

FIGS. 1 and 2 are, respectively, top and bottom perspective views of a razor cartridge according to one embodiment of the invention.

FIGS. 6–8 are a plan view, front elevation view, and vertical section view, respectively, of the blade used in the razor cartridge of FIG. 1.

FIG. 9 is an exploded perspective view of an insert molding device used in a method according to one embodiment of the invention.

FIGS. 11–13 are perspective views showing steps in an insert molding process using the device shown in FIGS. 9–10.

DETAILED DESCRIPTION

Razor Cartridge Structure

Figure 1:
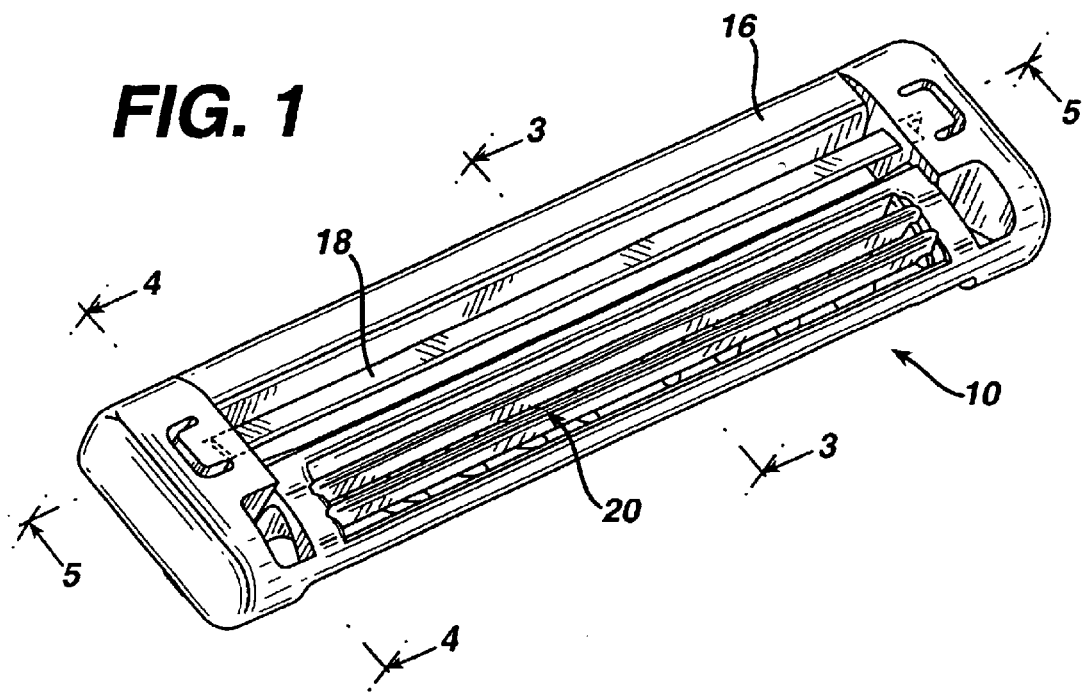

Referring to FIG. 1, razor cartridge 10 includes a molded plastic housing 16, which carries a blade 18 and includes a guard 20.

Referring to FIG. 2, cartridge 10 also includes recesses 24 constructed to receive an interconnect member 25 on a handle (shown in phantom) on which housing 16 is pivotally mounted. Interconnect member 25 removably and fixedly attaches the housing 16 to the handle, and has two arms 26 that pivotally support housing 16 at its two sides.

Figure 1A:
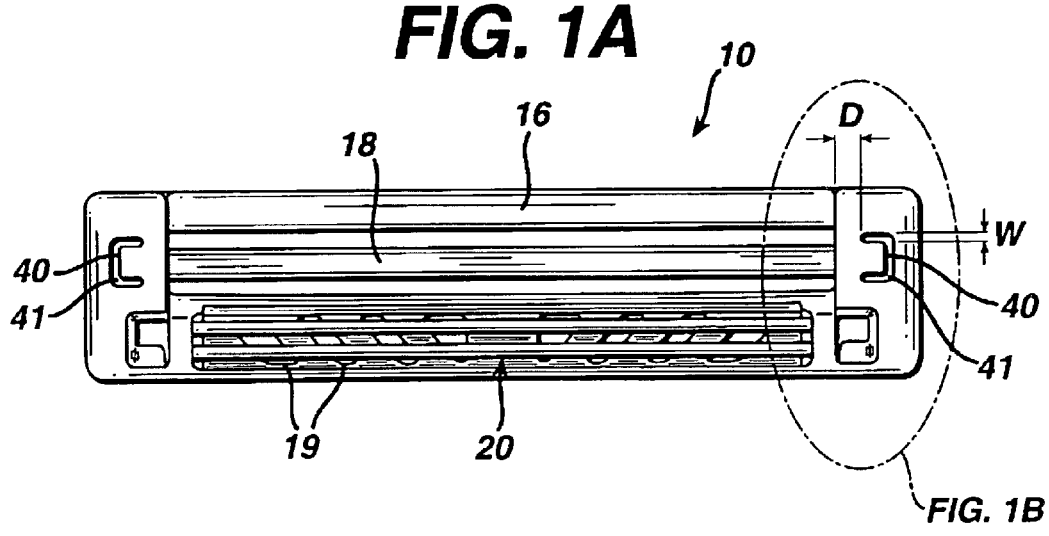
FIG. 1A is a top view of the razor cartridge.

Guard 20 includes a finned unit molded on the front of housing 16 to engage and stretch the user's skin; other skin engaging protrusions, e.g., as described in U.S. Pat. No. 5,191,712, which is hereby incorporated by reference, can be used. Guard 20 may be formed of elastomeric material, or may be formed of the same material as the rest of housing 16. Preferably, the fins are progressively taller toward the blade 18, so as to lift the hair gradually for a closer, more comfortable shave. As shown in FIG. 1A, the guard 20 may include a plurality of cored-through openings 19, configured to provide flushing of soap, hair and debris through the guard.

The razor cartridge 10 may also include other components (not shown) that improve the performance or extend the life of the cartridge. For example, a piece of aluminum may be included to act as a sacrificial anode. Also, a shaving aid composite may be provided at the upper edge of the housing 16 to deliver a lubricious substance to the user's skin, e.g., as described in U.S. Pat. Nos. 5,113,585 and 5,454,164, the disclosures of which are hereby incorporated by reference.

Referring to FIGS. 6–8, blade 18 is welded at welds 60 to an upper portion 62 of a blade support 34, forming a supported blade. Base portion 32 of blade support 34 extends beyond blade 18 and upper portion 62 at support ends 64. Cutting edge 28 of blade 18 is very susceptible to nicking, dulling, and other damage during manufacturing, and thus requires careful treatment during the manufacturing process, as will be discussed below.

Figure 4:
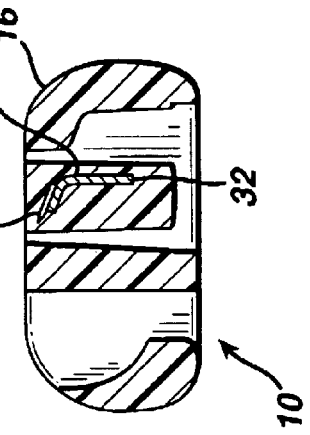
FIGS. 3–5 are cross-sectional views of the razor cartridge of FIG. 1, taken along lines 3—3, 4—4 and 5—5, respectively.
Figure 3:
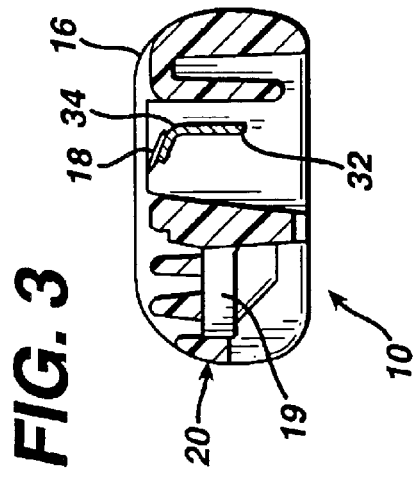

As shown in FIG. 4, the support ends 64 of blade support 34 are captured by the molded plastic of housing 16, preventing movement of the supported blade. Generally, at least 0.5 mm of blade structure should be captured at each end. The ends of the blade 18 are generally encapsulated, i.e., covered with plastic as shown, so that the sharp corners of the blade edge cannot make contact with the skin. (If the cartridge design is such that the edge, if exposed, would not contact the skin, e.g., if a portion of the housing extends beyond the area from which the edge would extend, then it is not necessary to cover the edge.) The length of the blade 18 is not attached to the housing, and is not supported by the plastic of the housing. Instead, as shown in FIG. 3, an open area 36 is provided behind and around blade 18, allowing hair and debris to be easily washed out of the blade area and thus preventing hair and debris from clogging the blade area. Preferably, there is a clearance of at least about 0.4 mm between the edge of the blade support 34 that is closest to the housing and the housing. For systems including a plurality of blades, a clearance of a similar size between blades may be desirable. The relative stiffness of the supported blade allows the blade to be supported only at its ends, without excessive flexing occurring during shaving.

Figure 1B:
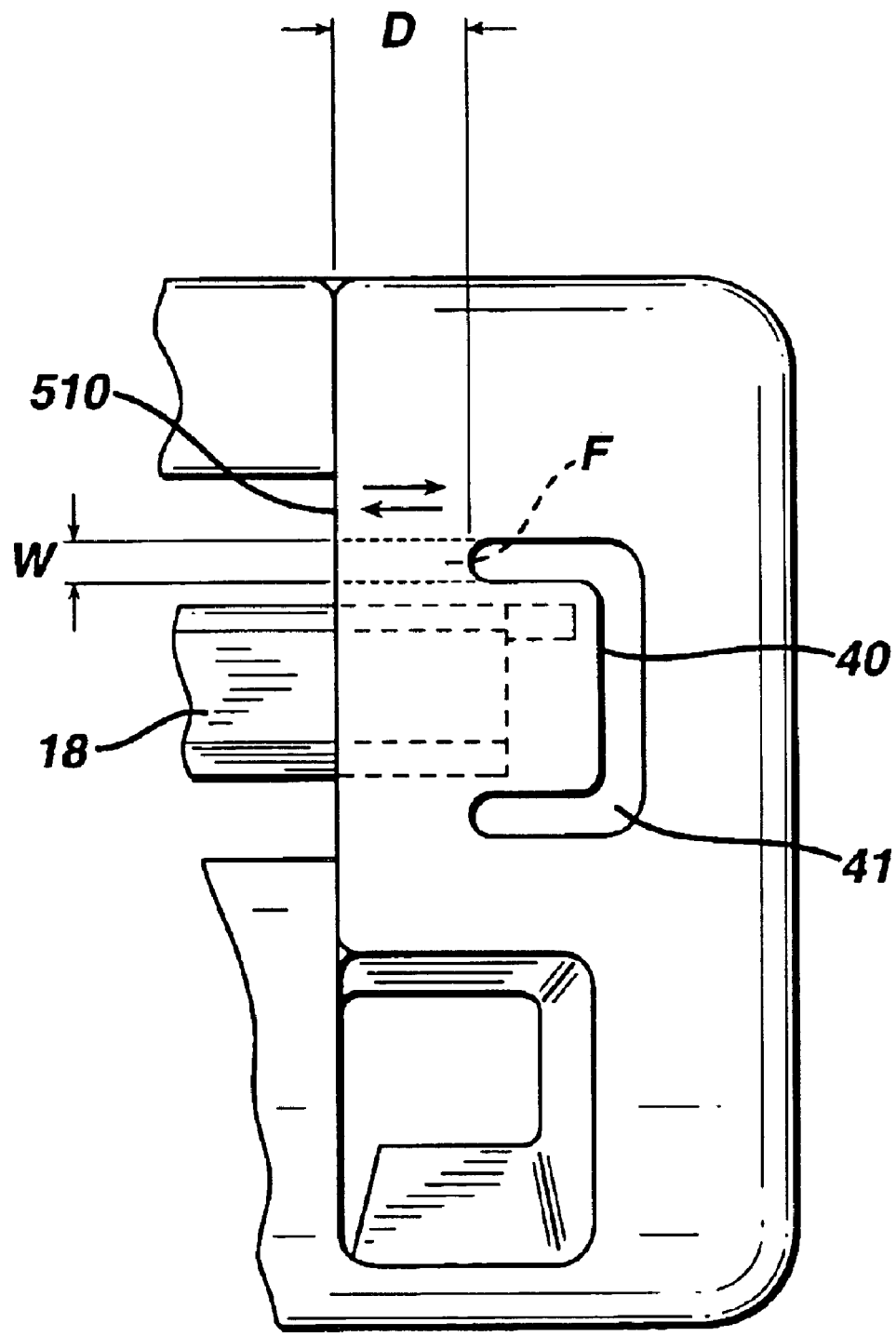
FIG. 1B is an enlarged detail view of area B in FIG. 1A.

As shown in FIG. 1B, open areas 41 surround the blade ends, extending towards edge 510 of the cartridge. A small, flexible region of plastic "F" is defined by the width W of the open area 41, and the distance D from the end of open area 41 to the edge 510 of the cartridge. This flexible region F provides a flexible interface between (a) the plastic adjacent the rigid blade, which is substantially immovable due to the presence of the blade, and (b) the plastic on the other side of region F, which is subjected to shear forces (arrows, FIG. 1B) due to shrinkage of the plastic after molding. Thus, this flexible interface accommodates the shrinkage differential between the two areas of the cartridge, tending to prevent the cartridge housing from warping, and/or the blade from buckling, events which could otherwise occur. Generally, to accomplish this stress relief, it is preferred that dimension D be as small as possible, while still maintaining sufficient cartridge durability, and width W be as large as possible while still maintaining an acceptable cartridge size.

Figure 5:
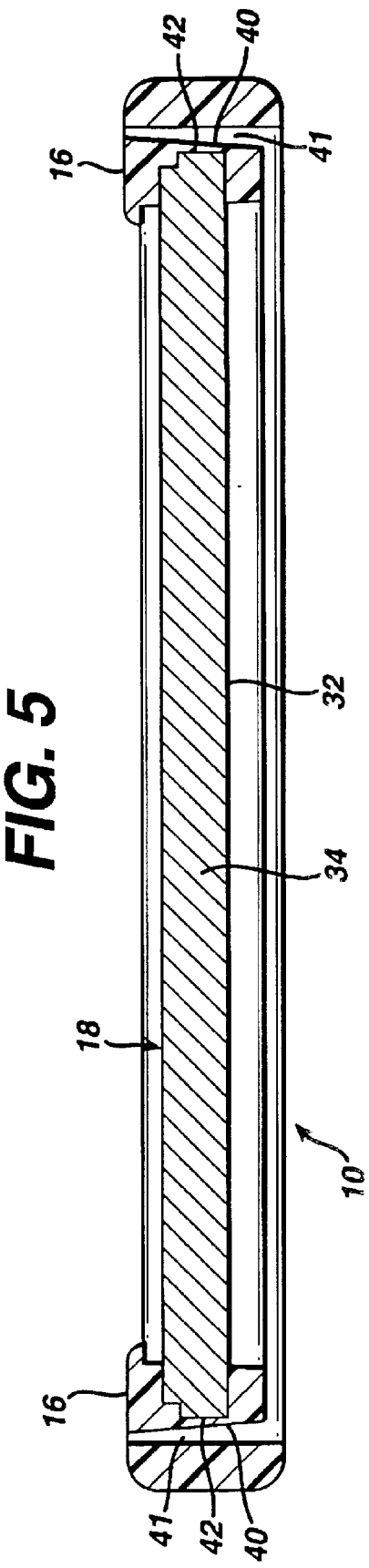

Generally, it is preferred that open areas 41 extend through the thickness of the cartridge, as shown, e.g., in FIG. 5, allowing balanced shrinkage of the cartridge around the blade without a force being exerted between the blade and cartridge, thereby preventing warping and buckling. In some cases, the open areas may extend only partially through the thickness of the cartridge. An example of such an implementation will be discussed in the Other Embodiments section, below.

In the embodiment shown in FIGS. 3–5, the blade is not allowed to move, except for the slight movement of the terminal ends in the direction indicated by arrows A. The fixed mounting of the blade at its ends provides good stiffness along the entire length of the blade, minimizing or even completely preventing vibration and chatter during shaving.

Single Blade Insert Molding Device

Figure 9A:
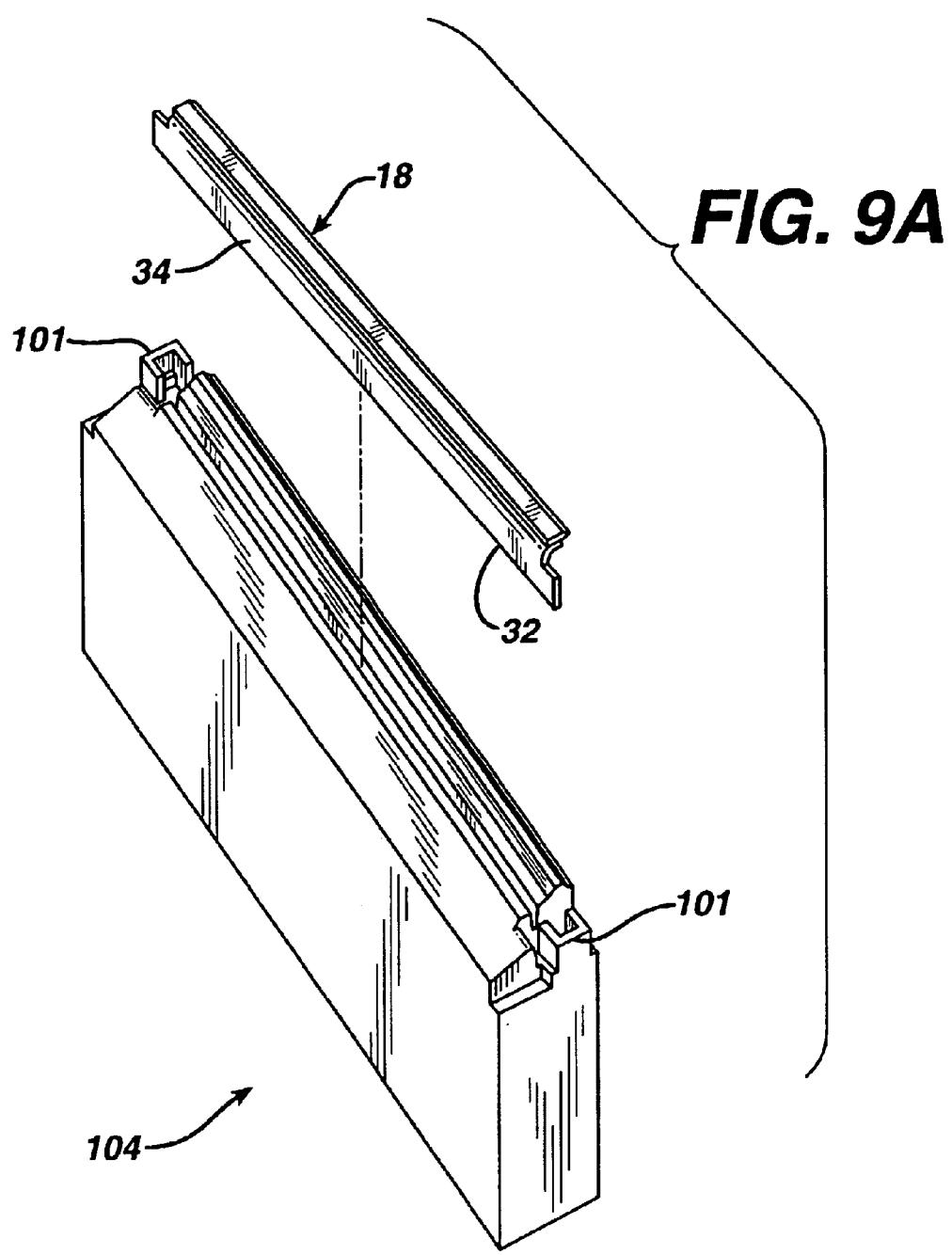
FIG. 9A is an enlarged detail view of a portion of the insert molding device.
Figure 10:
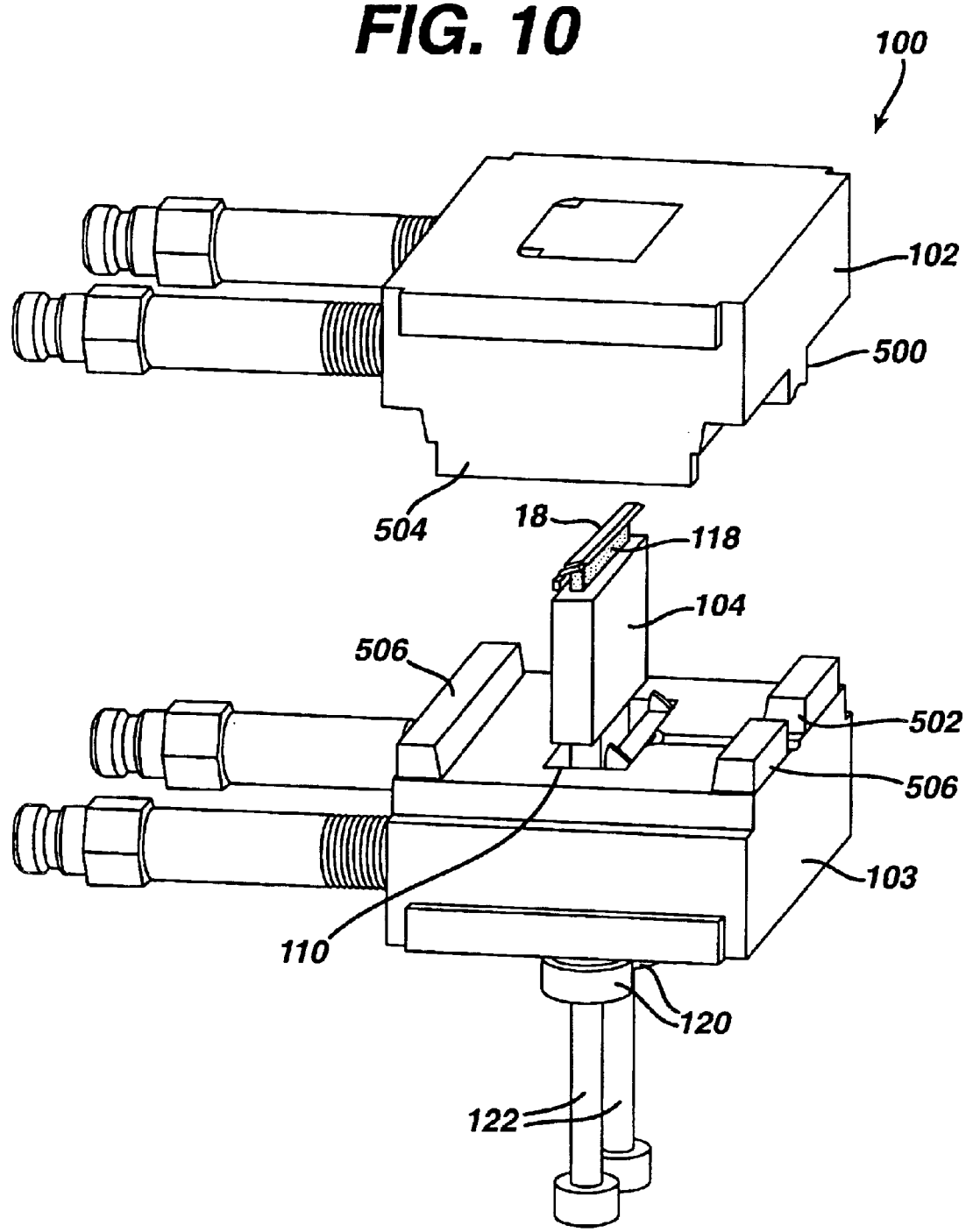
FIG. 10 is an assembled view of the insert molding device of FIG. 9.
Figure 12:
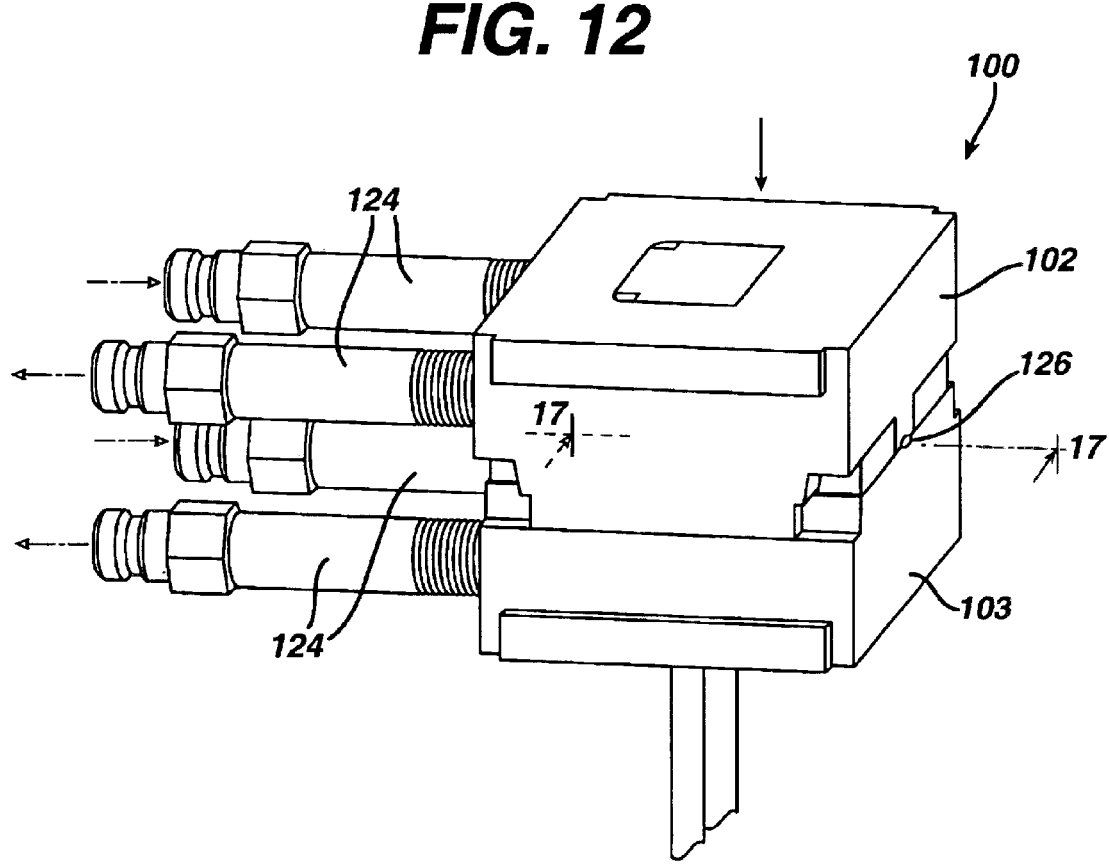
Figure 15:
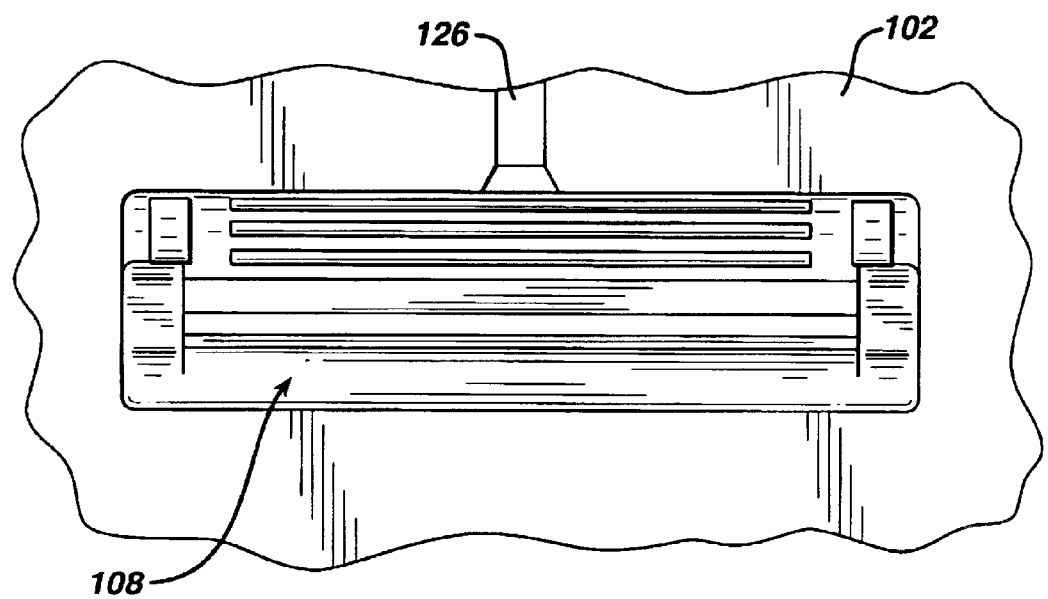
FIG. 15 is a bottom plan view of the upper portion of the molding cavity of the device shown in FIGS. 9–10, as indicated by line 15—15 in FIG. 9.
Figure 16:
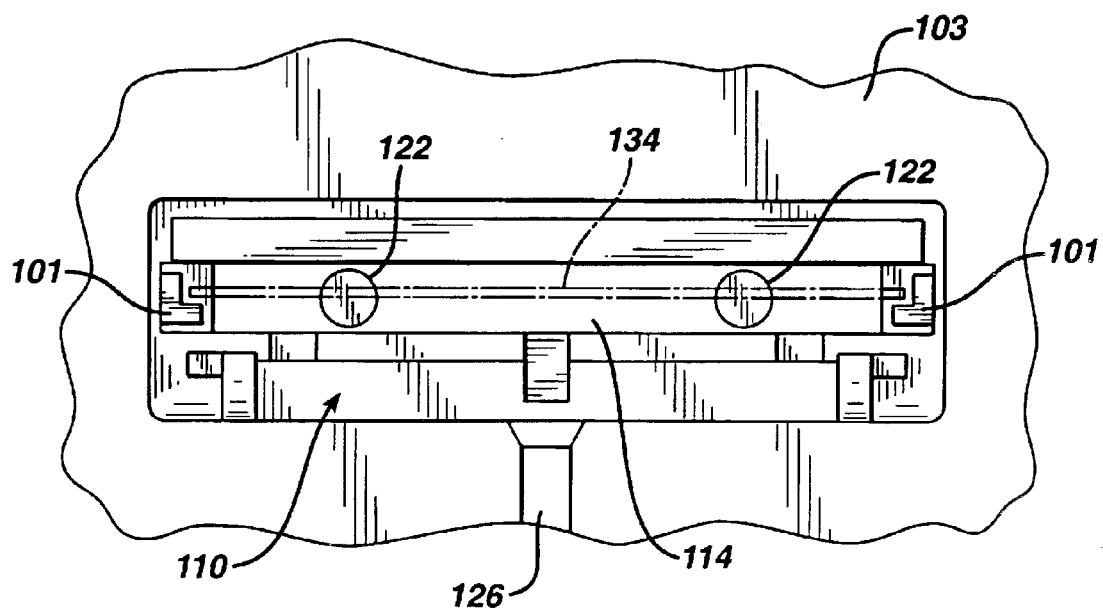
FIG. 16 is a top plan view of the lower portion of the molding cavity of the device shown in FIGS. 9–10, as indicated by line 16—16 in FIG. 9.
Figure 17:
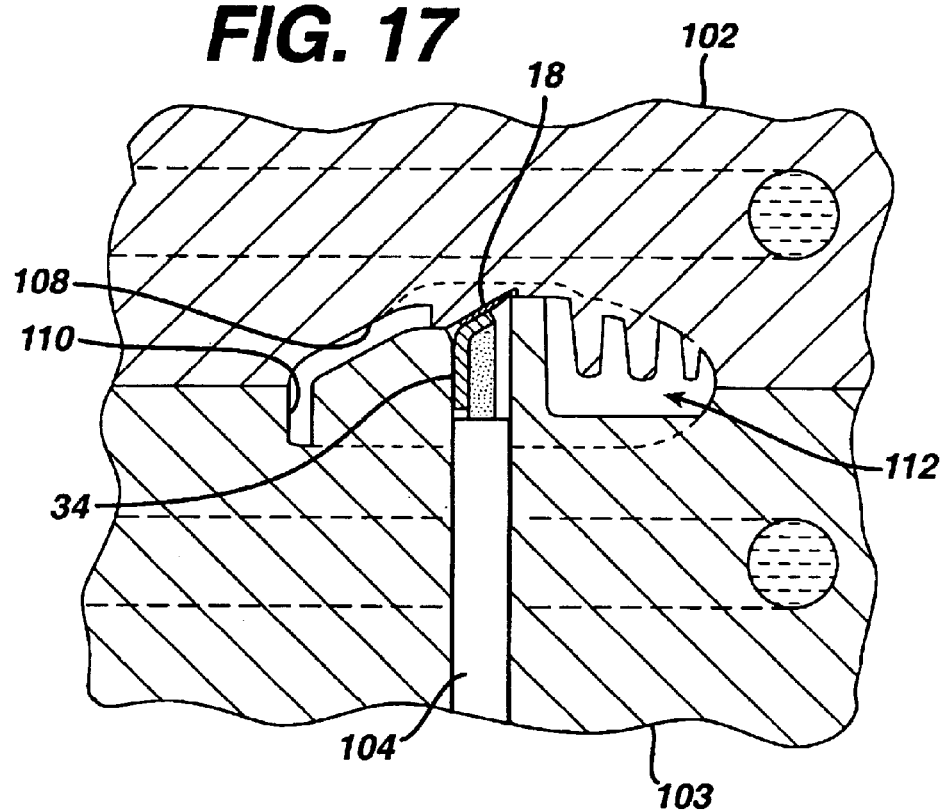
FIG. 17 is a cross-sectional view of the device as shown in FIG. 12, taken along line 17—17, prior to injection of resin into the molding cavity.
Figure 18:
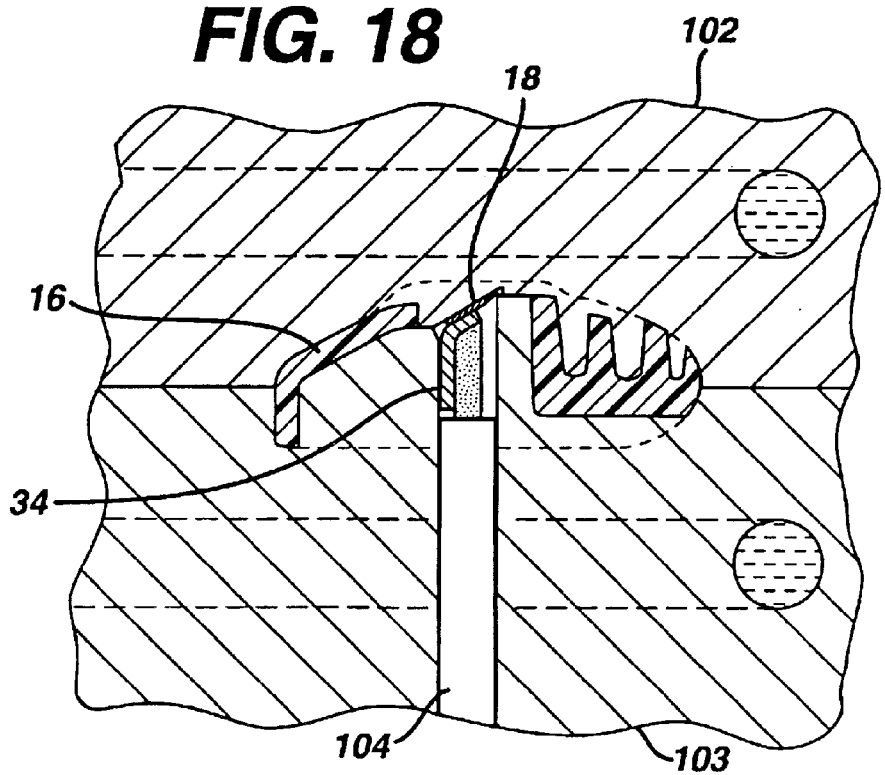
FIG. 18 is a cross-sectional view of the device as shown in FIG. 12, after injection of resin into the molding cavity.
Figure 19:
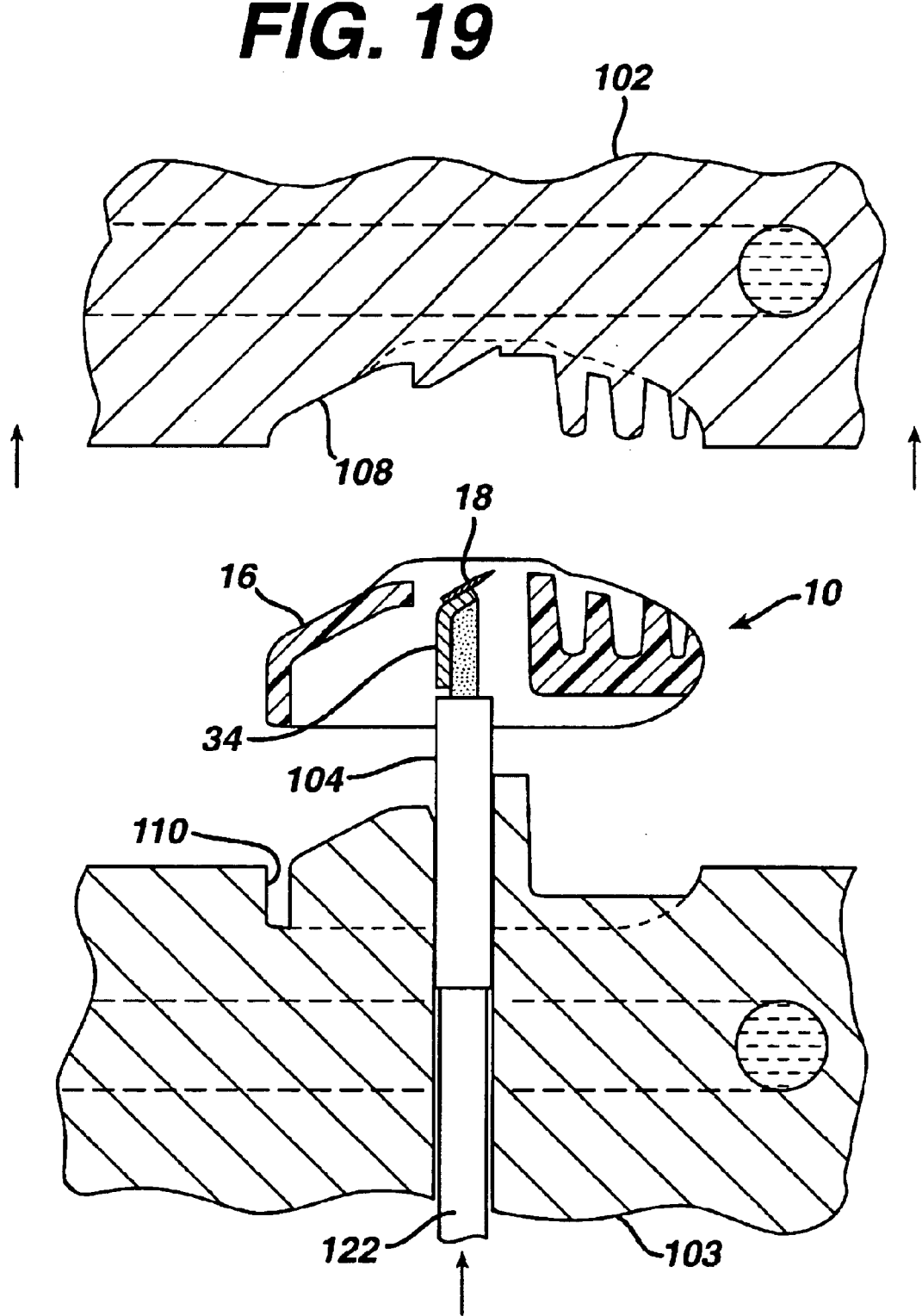
FIG. 19 is a cross-sectional view corresponding to FIG. 14.

An insert molding device 100 for use in manufacturing the cartridge 10 is shown in FIGS. 9 and 10. Insert molding device 100 includes an upper cavity block 102, a lower core block 103, and a removable core insert 104. Upper cavity block 102 includes an upper mold portion 108 (FIG. 15) and lower core block 103 includes a lower mold portion 110 (FIG. 16). When the upper cavity block 102 and lower core block 103 are brought into contact, as shown in FIG. 12, upper mold portion 108 and lower mold portion 110 together provide a molding cavity 112 (FIGS. 17 and 18). The shape of molding cavity 112 corresponds to the shape of the cartridge housing 16. Lower mold portion 110 includes an aperture 114 (FIG. 16), through which the removable core insert 104 can be inserted into the molding cavity 112, as shown in FIG. 17 and discussed below.

Core insert 104 includes an upper edge 116 having a magnetic strip 118 to which the entire length of blade 18 can be releasably secured. Because the blade is held securely along its length, it can be transported with the core insert from station to station during manufacturing, without nicking or otherwise damaging the blade. The magnetic strip 118 also prevents blade 18 from moving or shifting during the delivery of the core insert to the mold.

Figure 13:
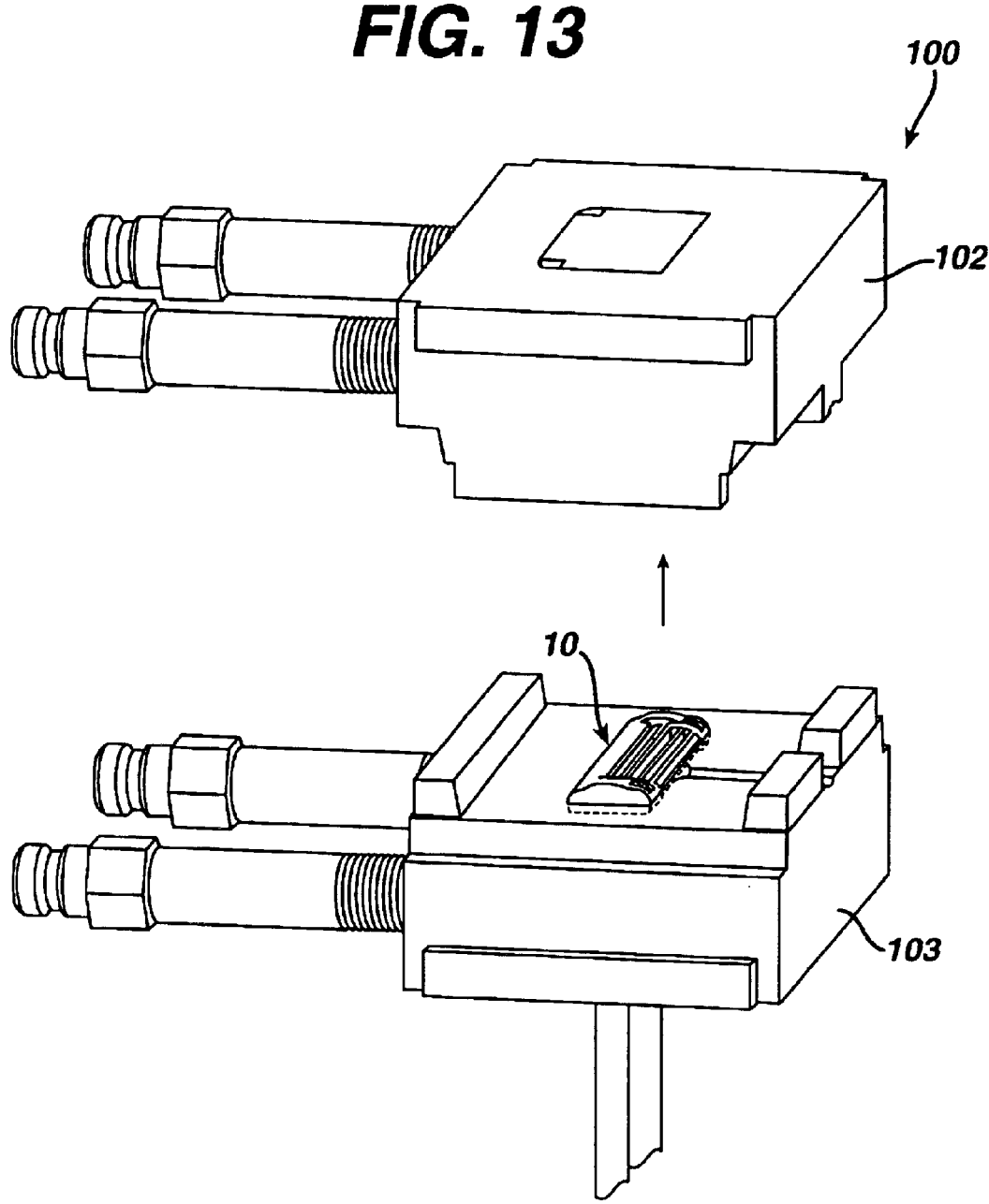

Insertion of the core insert 104 into aperture 114 is guided by core insert guide bushings 120 and core insert guide pins 122. Guide pins 122 prevent damage to the molding surfaces, and allow a very small clearance to be maintained between the core insert 104 and aperture 114. Block 104 seals the molding cavity when the core insert is in the position shown in FIG. 13.

Coolant is delivered to the upper cavity block 102 and lower core block 103 by pipes 124, and circulated through blocks 102, 103 as is well known in the molding art. Resin is delivered through a gate 126.

Single Blade Insert Molding Process

Prior to beginning the insert molding process described below, a supported blade is positioned on the magnetic strip 118 of the core insert 104. This step is generally performed at a separate station, after which the core insert 104 is transported to the insert molding device 100. The blade can be fed to and positioned on the magnetic strip in any suitable manner, examples of which will be discussed below. Robotics may be used to position the blades.

After blade positioning, the core insert would generally be inspected and the blade height measured to ensure that the finished cartridge will meet product specifications, i.e., that the blade will be properly positioned when its ends are encapsulated in resin. The blade height may be incorrect if, for example, there is a burr on the blade or there is debris on the blade or the core insert. Acceptable variation in blade height is generally on the order of 0.005" less than the specified maximum blade height. If the blade height is outside of the acceptable range of variation, the blade is removed and repositioned. The blade and/or core insert may be cleaned, e.g., by an air blast. The blade height may be measured in any suitable manner, e.g., by mechanical measurement or by a vision system.

Proper side-to-side positioning of the blade is provided by coring towers 101 (FIG. 9A), which align the blade in the side-to-side direction. These coring towers are omitted in FIGS. 9 and 10, due to the scale of these figures, but are shown in FIG. 9A, which is an enlarged view of a suitable core insert. In the embodiment shown in FIG. 9A, the core insert includes an elongated blade slot, as will be discussed in detail below. In addition to aiding in positioning of the blade, coring towers 101 provide open (cored out) areas 41 in the finished product, as discussed above. Positioning could also be provided by other techniques, e.g., by putting a groove in the blade support and a corresponding notch in the tool that applies the blade to the insert.

Blade loading, positioning and retaining can also be accomplished using the process described below in the "Multi-Blade/High Speed Manufacturing Process" section.

Next, the core insert 104 is moved into alignment with upper cavity block 102, which remains stationary throughout the molding process. When core insert 104 is properly aligned, lower core block 103 is moved into alignment with the core insert and the upper cavity block 102, and the core insert 104 is inserted into the core block 103 (FIG. 1).

The mold is then closed (lower core block 103 is moved into contact with upper cavity block 102) as shown in FIG. 12. The closed mold defines mold cavity 112 (FIG. 17). Interlocking alignment features 500, 502, 504 and 506 (FIG. 10) are provided on the upper cavity block 102 and the lower core block 103 to ensure a precise alignment of the mold halves, allowing the geometry of the finished cartridge to be carefully controlled.

The core insert 104 defines an area under the blade that will be open in the finished cartridge. The open area under the blade is maintained by providing clearances for blade loading that are sufficiently small so that the plastic, due to its viscous nature, cannot flow into the open areas. For some commonly used plastics, the clearances will be less than 0.005 inch; smaller clearances may be required for plastics with lower melt flow indices. These mold design criteria are well understood in the insert molding field.

The open areas are filled during the mold filling process through a gate 126 (FIG. 16) that is positioned centrally to split the flow of plastic into the cavity causing the flow front to pass by the ends of the embedded blade. This gate positioning allows a small, solidified area of plastic to form before the cavity is completely filled. The small, solidified area of plastic, called a "skin", covers the blade loading clearances thereby limiting and slowing down the penetration of the molten plastic into these clearances. Thus, positioning of the gate in this location allows skinning up of the blade loading clearances to occur prior to complete mold filling and packing, advantageously allowing these clearances to be provided without undesirable flow of plastic along the length of the blade. It is not necessary that the gate be in the center, so long as it is placed so that a substantial portion of the resin flow goes by the blade ends before the cavity is filled, allowing partial solidification of the flow front before the cavity is completely filled.

Next, resin is injection molded into cavity 112, through gate 126, as shown in FIG. 18. During this process, coolant is circulated from pipes 124 through the core block 103 and cavity block 102 to facilitate cooling and solidification of the resin. The membrane feature discussed above prevents buckling of the blade during cooling and solidification (which generally results in shrinkage of the resin).

Figure 14:
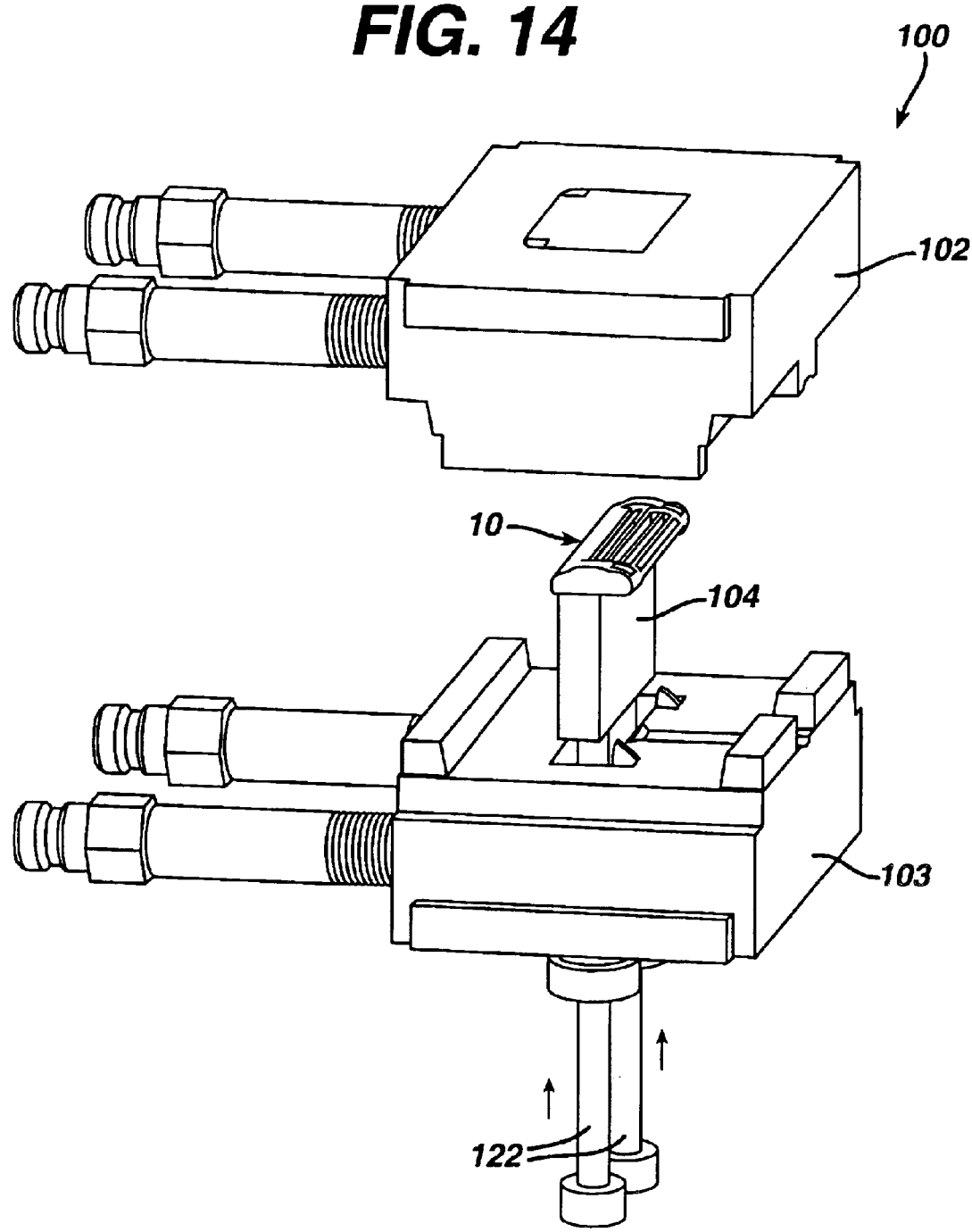
FIG. 14 is a perspective view of the insert molding device of FIG. 9 with a finished razor cartridge.

The resulting molded cartridge 10 is shown in FIG. 14, after the core block 103 has been lowered, opening the mold, and the core insert has been lowered to demold the finished cartridge 10 from the upper mold portion 108. The finished cartridge may be removed using robotics or other suitable techniques, either with the core insert in the position shown in FIG. 14, or with the core insert removed from the core block 103.

After demolding, another core block 103 (or the same one, if desired) is indexed into position under the upper cavity block 102 and the process described above is repeated.

Multi-Blade/High-Speed Manufacturing Process

While the process described above is generally practical when loading a single blade in a relatively low-speed process, it may become less so when loading multiple blades, and/or at high manufacturing speeds. In these situations, the close fit between the blade and the mold may make it difficult to properly position the blade(s) in the core insert.

One technique for addressing these issues is the use of a core insert having one or more blade slots that are configured to allow the elongated blade support to be quickly and accurately positioned in the slot and retained there during molding.

Figure 21:
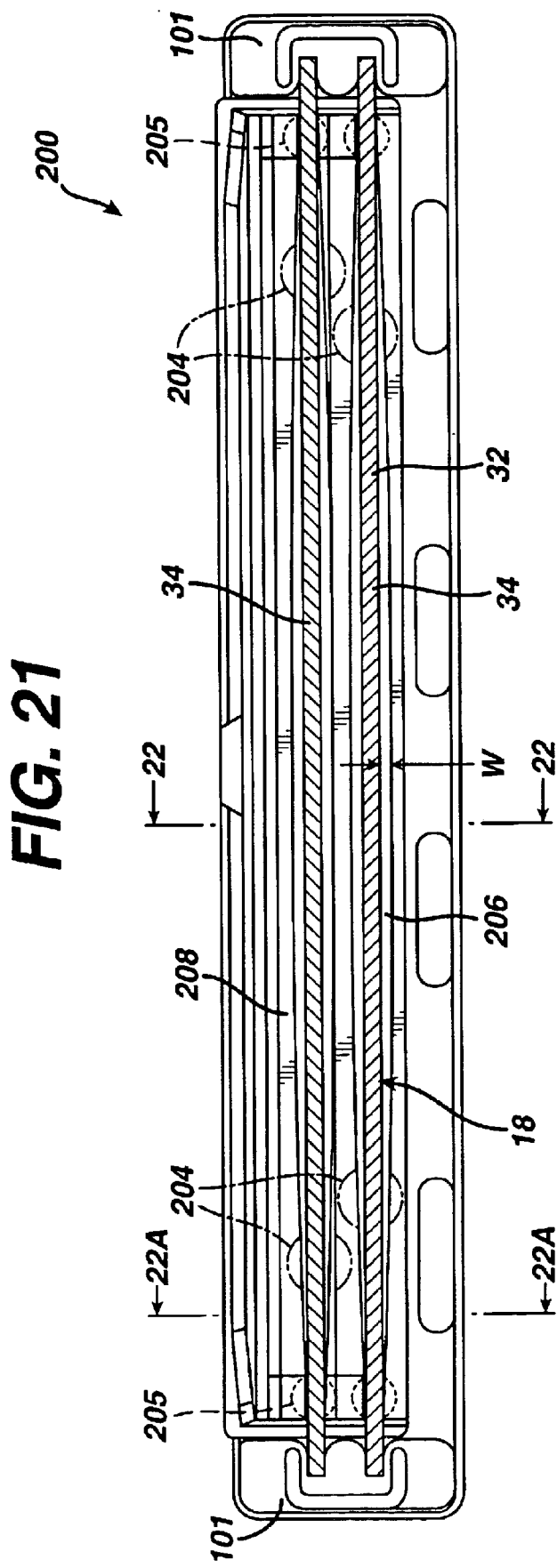
FIG. 21 is a top view of a core block suitable for use in the insert molding process shown in FIGS. 11–13.
Figure 22:
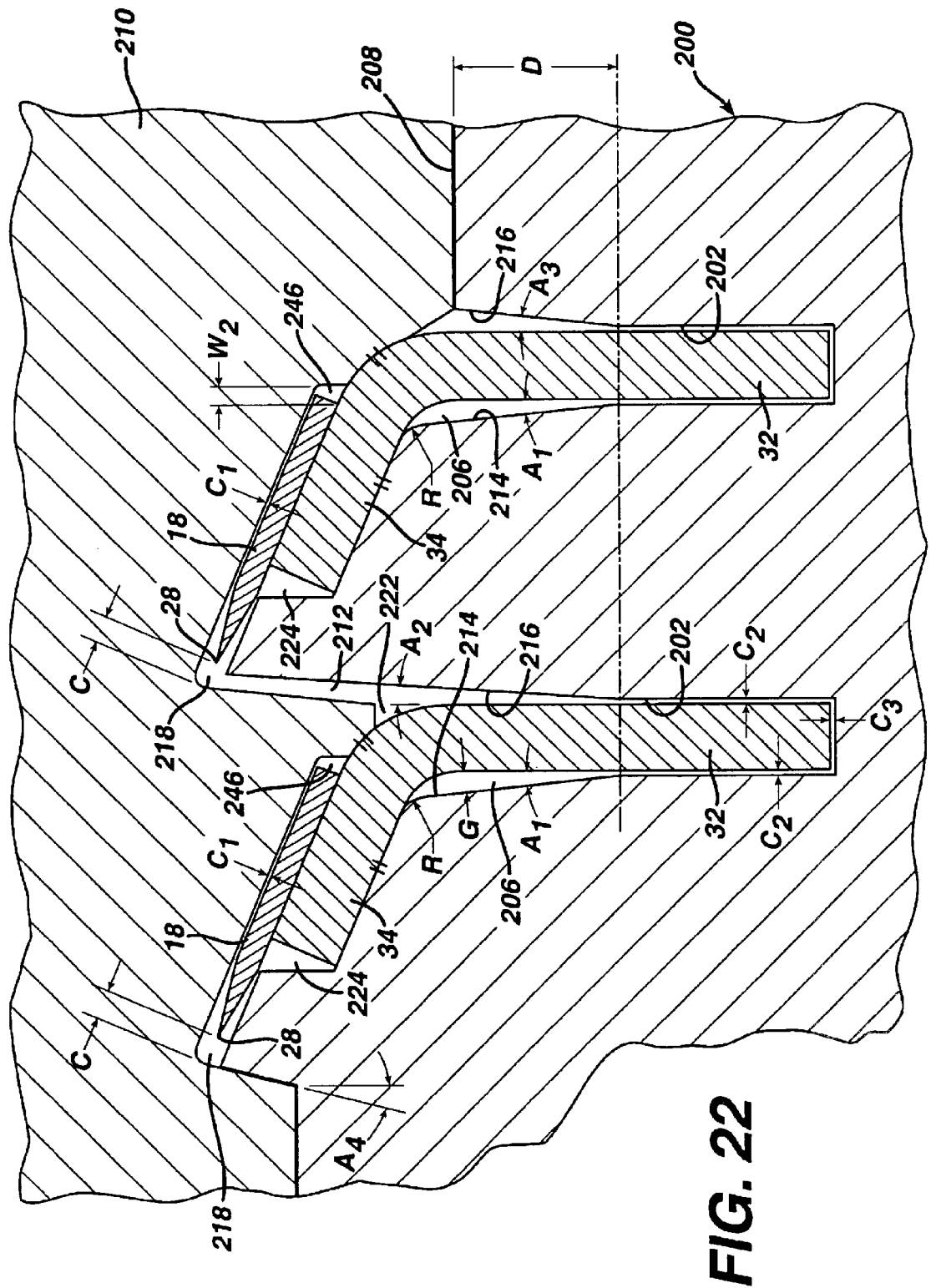
FIGS. 22 and 22A are cross-sectional views of a two-blade core block similar to the core block of FIG. 21, taken as indicated by lines 22—22 and 22A—22A of FIG. 21, respectively, with supported blades in place for molding.
Figure 22A:
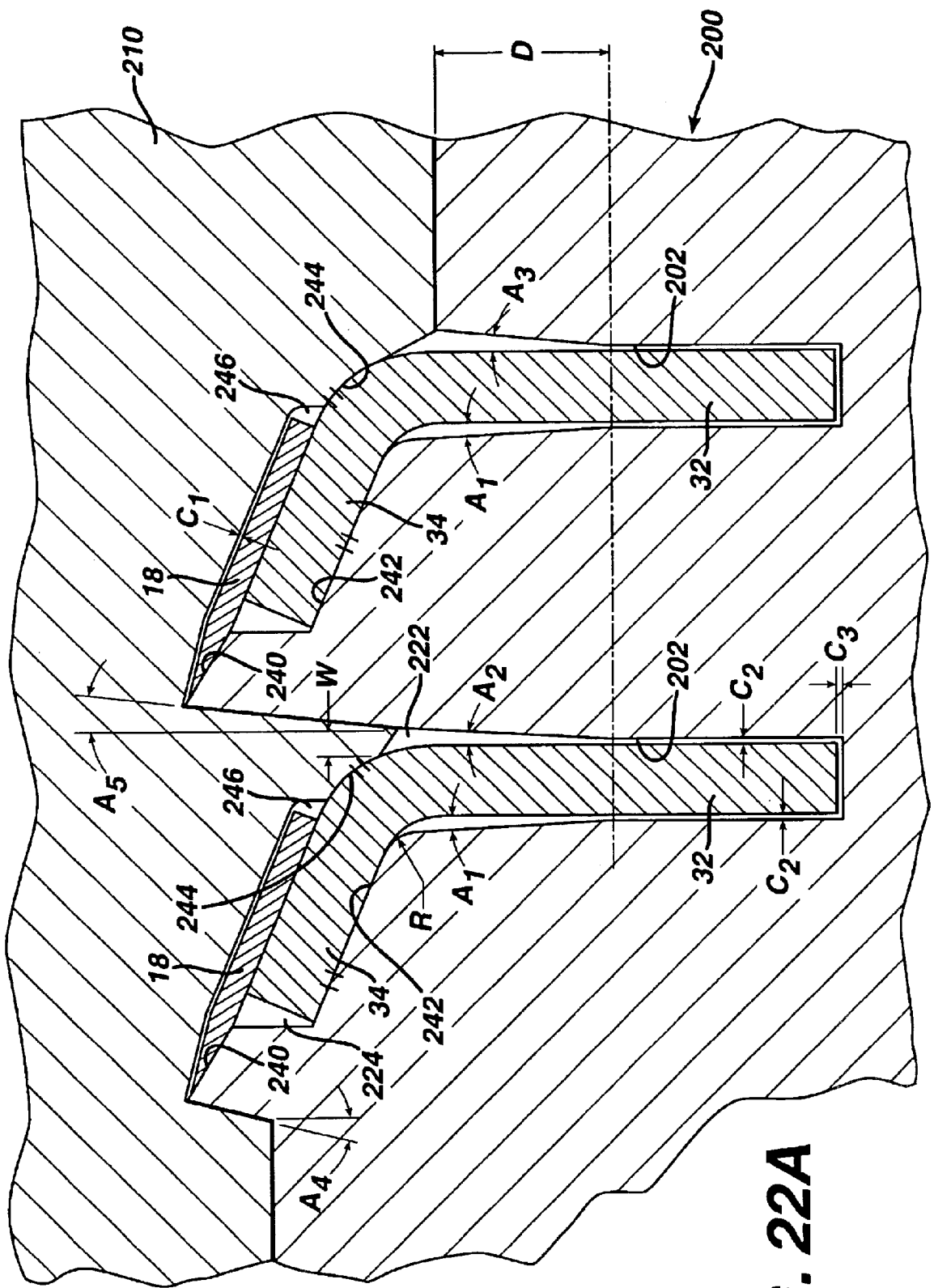

A suitable core insert 200 for a two blade cartridge is shown in FIG. 21. FIGS. 22 and 22A show cross-sectional views of a mold cavity including core insert 200, taken in the areas of the core insert 200 that are indicated by section lines 22—22 and 22A—22A in FIG. 21. Supported blades 18 are positioned in the core insert, with base portion 32 of each blade support 34 extending into a blade slot 202 (FIGS. 22, 22A). A vacuum source 204 (FIG. 21) holds the blades firmly in place after they have been delivered to the blade slot. Alternatively, if desired, the blades may be held in the slot magnetically, or mechanically, e.g., by spring-loading the walls of the blade slots. Ejector pins 205 (FIG. 21) break the vacuum and force the finished cartridge out of the mold after the injection molding cycle is completed.

Lead-in angles are provided to facilitate delivery of the blades to the blade slot. Under normal molding conditions, ordinary design practice in the prior art would be to provide minimal clearance between blade and mold to minimize flash. However, we have found that gaps can be provided to facilitate blade insertion and positioning, as will be discussed below, without undesirable flow of resin along the blade. Importantly, providing these gaps allows blades to be loaded quickly and positioned precisely, even at high manufacturing speeds. These gaps also allow multiple blades to be positioned close together, for a compact, aesthetically pleasing cartridge design.

The preferred geometry of the blade slots is shown in detail in FIGS. 22 and 22A. In FIGS. 22 and 22A, an upper cavity block 210 is in place, defining a mold cavity 212 in which the supported blades 18 are positioned. FIG. 22 shows the geometry of the blade slots and upper cavity block 210 at the center of the blade (the position indicated by line 22—22 in FIG. 21), while FIG. 22A shows the geometry at the pinch-off areas (the position indicated by line 22A—22A in FIG. 21). The pinch-off areas are in a non-shaving area of the blade, sufficiently inboard of the blade ends to allow the blade ends to be encapsulated but sufficiently close to the blade ends so that shaving performance is not significantly impacted by any damage to the cutting edge in these areas. The pinch-off areas are typically about 0.020 to 0.030 inches inboard from the blade ends. As will be discussed in detail below, the geometry of the mold tooling is different in the blade center than it is at the pinch-off areas. Because it is only necessary to shut-off on the blade in the pinch-off areas to prevent flash along the blade, larger lead-in angles and other open areas can be provided inboard of the pinch-off areas.

Referring to FIG. 22, at the blade center the blade slots have the following dimensions: lead-in 206 has a depth D of from about 0.020 to 0.030 inch, preferably about 0.026 inch; the supporting surfaces 214 of the core insert have a radius of curvature R, adjacent the curved portion of blade support 34, of about 0.005 to 0.007 inch, preferably about 0.006 inch; the angle $A_1$ of the lead-in on the supporting surface side of the slot is from about 6 to 8 degrees, preferably about 7 degrees; the angle $A_2$ of the lead-in on the opposite, positioning side 216 of the left-hand blade slot, is from about 2.5 to 4.5 degrees, preferably about 3.5 degrees for the left-hand blade slot, and the angle $A_3$ of the lead-in on the opposite, positioning side 216 of the left-hand blade slot, is from about 6 to 7 degrees, preferably about 6.3 degrees. Angles $A_1$, $A_2$ and $A_3$ are measured from the planar surface of base portion 32 of blade support 34 to the facing walls of the blade slot. Angle $A_2$ is smaller than angle $A_3$ because angle A2 must be relatively small at the shut-off area (shown in FIG. 22A) to prevent flow of resin along the blade, whereas $A_3$ can be selected to provide an optimal lead-in.

There is generally very little clearance between the lower portion of each blade slot (below the lead-in area 206) and the blade support. Typically, clearance $C_2$ is about 0.0002 to 0.0004 inch on each side of the blade support, preferably about 0.0003 inch. A small clearance C3 is provided at the bottom of the blade slot, to accommodate tolerance in the length of the blade support, so that the cutting edge is not positioned based on the length of the blade support. $C_3$ is typically about 0.0004 to 0.0006 inch, preferably about 0.0005 inch.

Generally, the lead-in areas 206 should be wide enough to provide guidance to the blade during insertion of the blade into the blade slot, but narrow enough so that flow of resin along the blade in the lead-in areas is minimized. The depth D should be sufficient to guide the blade during insertion, but limited enough so that the blade support 34 is supported by the blade slot and does not shift sideways before or during molding. The maximum gap G, between the left side of the blade slot and the left side of the blade, is constrained by the need to shut off resin in the pinch-off areas (shown in FIG. 22A and discussed below). This gap needs to be small in the pinch-off areas, to minimize flashing, and can only increase to a certain extent along the length of the blade (as shown by the sweeping curve in FIG. 21). Thus, the maximum gap G is typically about 0.002 to 0.004 inch, preferably about 0.003 inch.

The core insert 200 and upper cavity block 210 also define an open area 222, at the back curved surface of blade support 34. Including open area 222 in the mold cavity design allows the upper cavity block to be relatively robust (if this open area were not included, the upper cavity block would include a potentially fragile "feather edge" that extends into the narrow open area 222 shown in FIG. 22A). Limiting this feather edge by including open area allows multiple blade to be closely spaced, without compromising mold durability. These open areas are configured to minimize undesirable resin flow along the blade, because the flow front of the injected resin cools and stalls before it travels very far into these areas because of the previously mentioned strategic gating location. Thus, the open area 222 is considerably smaller at the pinch off areas, shown in FIG. 22A, than in the middle of the blade. In the pinch-off areas, open area 222 preferably has a width W of 0.003 to 0.005 inch, more preferably about 0.004 inch, whereas in the middle of the blade width W can be as large as desired, within the design constraints of the tooling.

As shown in FIG. 22A, in the pinch-off areas lead-in angle $A_2$, defined by the core insert 200, transitions to a larger angle $A_5$, defined by the upper cavity block 210. Angle $A_5$ is typically from about 5 to 7 degrees, preferably about 6 degrees, whereas angle $A_2$ is from about 2.5 to 4.5 degrees, preferably 3.5 degrees as discussed above with reference to FIG. 22. This angle change between the core insert and the upper cavity block serves to provide the open area 222 in the pinch-off areas.

Similarly, open areas 224 are provided under blade 18 at the front of blade support 34, to allow the blade support to seat properly during insertion into the blade slot, and also to allow the mold to be closed without damage to the blade support 34. Again, these areas generally do not result in undesirable resin flow along the blade. Preferably, open areas 224 have a width $W_1$, measured from the upper corner of blade support 34 to the facing wall of the core insert 200, of from about 0.004 to 0.006 inch, more preferably about 0.005 inch.

Open areas 246 are provided behind blade 18, to accommodate tolerance in the width of the blade. Like the other open areas discussed above, open areas 246 are sized to minimize flow of resin, while facilitating seating of the blade. Typically, open areas 246 have a width $W_2$ of 0.002 to 0.004 inch, preferably about 0.003 inch.

Referring again to FIG. 22, the geometries of the blade slot and the upper cavity block at the blade center (and along most of the length of the blade) also provide open areas 218 around each cutting edge 28 of blade 18, protecting the cutting edge from damage as a result of contact with the mold surface. Adjacent to the left-hand open area 218 the upper cavity block 210 defines an angle $A_4$ with respect to the vertical that provides a seal off in the pinch-off areas (shown in FIG. 22A and discussed below) and that provides a sliding force when the mold closes that pushes the blade into a correct position for molding. Angle $A_4$ is preferably from about 12 to 15 degrees, more preferably about 13.5 degrees. The clearance C between the cutting edge 28 and the opposed wall of the upper cavity block 210 is generally from about 0.003 to 0.005 inch, preferably about 0.004 inch. A clearance $C_1$ is also provided between the planar surface 220 of blade 18 and the upper cavity block, to accommodate variations in blade thickness. Clearance $C_1$ is generally from about 0.0002 to 0.0004 inches, preferably about 0.0003 inches.

As discussed above the geometries of the blade slot and the upper cavity block are different in the pinch-off areas (indicated by section lines 22A—22A in FIG. 21) than at the blade center (indicated by section lines 22—22 in FIG. 21.)

In the pinch-off areas, shown in detail in FIG. 22A, the open areas discussed above are sufficiently small that little if any resin will flash into the shaving area of the blade, and contact areas (i.e., areas of theoretical line-to-line contact between upper cavity block 210 and core insert 200) are provided to further prevent flashing. For example, to prevent flashing the upper cavity block 210 contacts the blade 18 in the pinch-off areas. While this contact may cause some damage to blade 18, this damage is acceptable because these areas near the ends of blade 18 are generally not a shavable area of the razor cartridge, i.e., these areas do not contact the user's skin during shaving.

Contact areas are indicated in FIGS. 22 and 22A by the symbol 11. The contact areas shown in FIG. 22A prevent flashing in addition to any other functions, e.g., positioning of the blade. The contact areas shown in FIG. 22, in the blade center, have no effect on flashing and thus are used solely to position and support the blade. The contact areas are (a) at the underside 240 of blade 18, to prevent resin from flowing along the length of the blade, (b) at the underside 242 of blade support 34 to support and properly position the blade, and (c) at the curved upper portion 244 of blade support 34, to contact blade support 34 and accommodate tolerance in the curvature of the blade support so that lead-in angles remain uniform.

As shown in FIG. 21, the lead-in area 206 is substantially bow-shaped when viewed from above (FIG. 21), and thus the dimensions of the lead-in area 206 vary along the length of the blade. This bow-shape accommodates bowing of the elongated blade as a result of manufacturing tolerances or bowing as it is transported to the slot. Thus, the width of the opening of the blade slot at the top surface 208 of the core insert 200 increases in a sweeping curve from each end of the slot towards the center, with the width W of the slot being at least about 0.015" greater at the center than at the ends, preferably about 0.015 to 0.020" greater. This bowed configuration causes the blade to be forced straight upon insertion into the slot. Because a bowed blade might position the cutting edge so as to be damaged, forcing the blade straight protects the blade edge from damage during molding.

Importantly, the blade slot geometry discussed above allows a blade to be quickly and easily fed into a very narrow slot, in which it is securely retained during molding. Because there is very little clearance between the blade slot and the blade support, without lead-in areas 206 it would be very difficult to insert the blade into the slot during high-speed manufacturing.

Figure 23A:
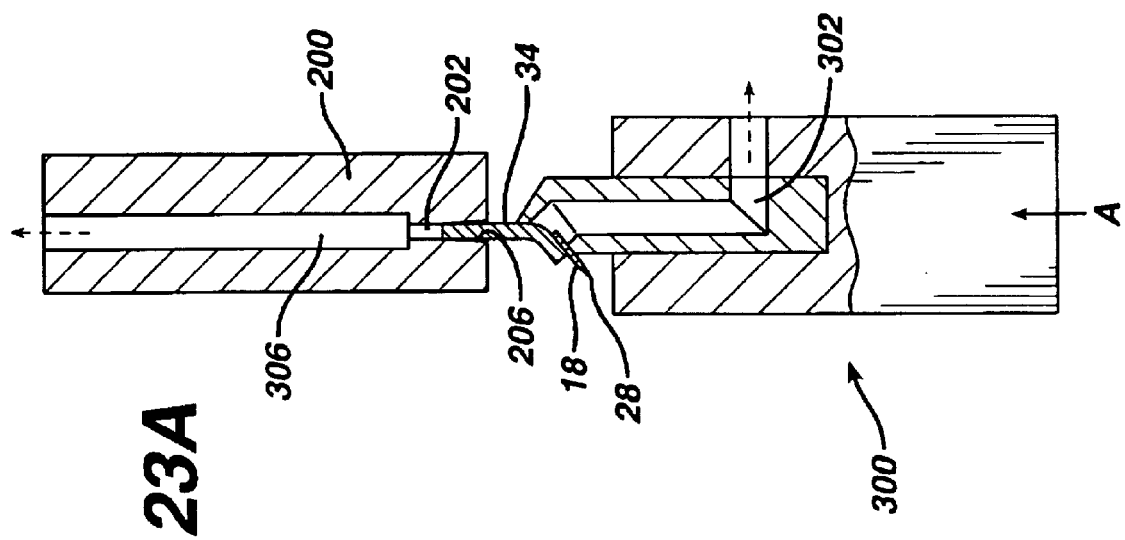
FIGS. 23 and 23A are, respectively, front and side views of a blade delivery device delivering a blade to a mold.
Figure 23:
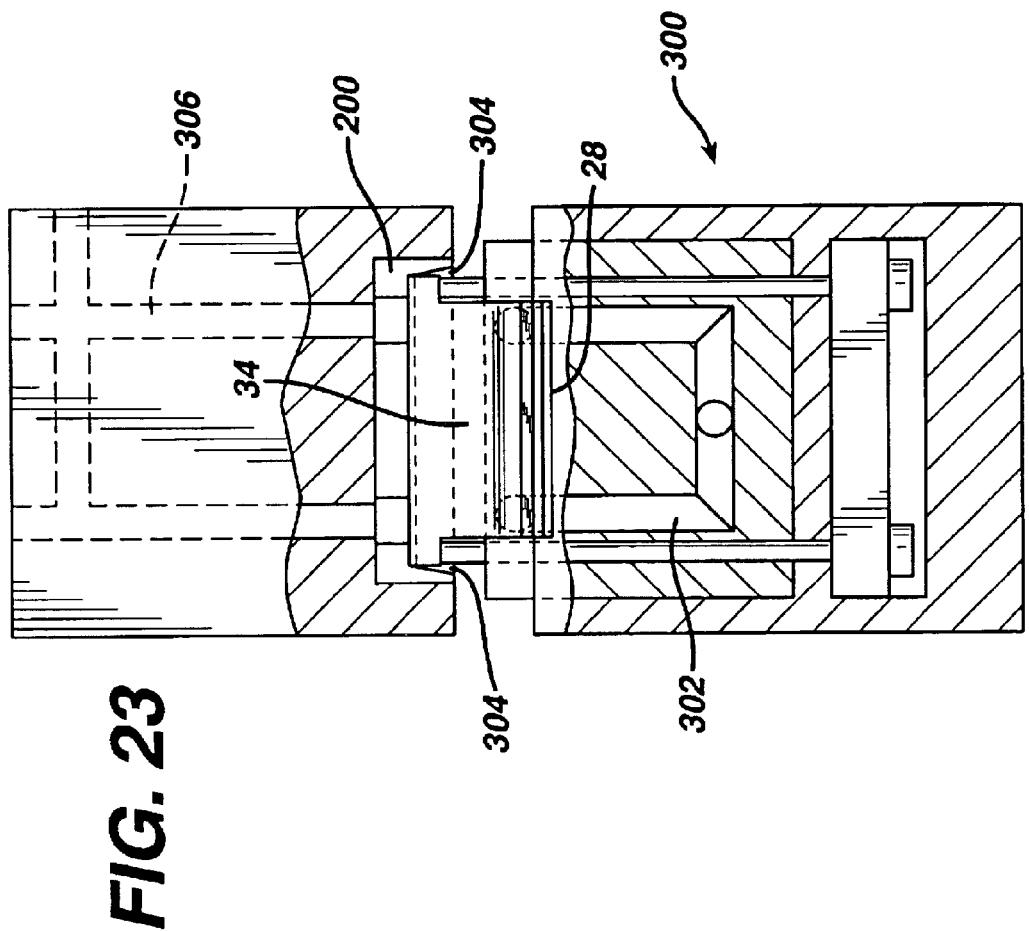

Suitable equipment for loading blades into the core insert 200, discussed above, is shown in FIGS. 23–23A. A blade delivery unit 300 carries the supported blade as shown in FIG. 23A, i.e., by holding the blade 18 without contacting its cutting edge 28. The blade is held in place on the delivery unit 300 by a vacuum source 302. A magnetic source (not shown) may be used instead of or in addition to the vacuum source 302. If used in addition to the vacuum source, the magnetic source will provide a back-up in the event of failure of the vacuum. The blade support 34 is inserted into blade slot 202 by moving the delivery unit 300 in the direction of arrow A. As discussed above, the blade support 34 is guided into blade slot 202 by the lead-in areas 206. Terminal lead-in areas 304 are also provided at the blade ends, angling the mold surface away from the blade ends as shown in FIG. 23. Lead-in areas 304 allow for misalignment of the delivery tool with the mold, further facilitating delivery of a supported blade to the blade slot. Lead-in areas 304 result in the taper of open area 41 that is visible in cross-section (FIG. 5), i.e., in open area 41 being wider at the base than at the top in the finished cartridge.

Figure 23B:
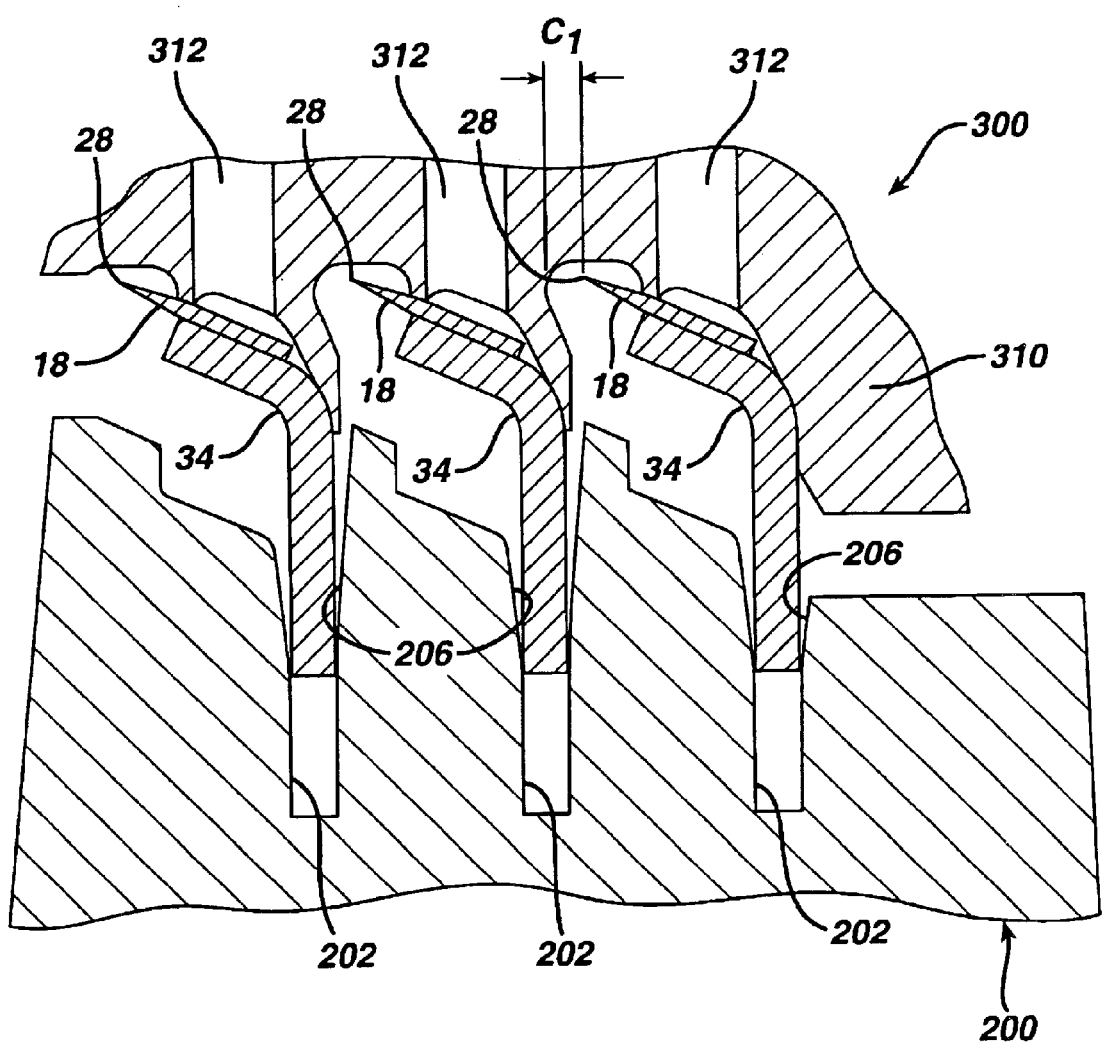
FIG. 23B is an enlarged detail view of a portion of the blade delivery device.

After insertion, the blade is held in the core insert 200 by a vacuum source 306. The blade delivery tooling is shown in detail in FIG. 23B. As shown in FIG. 23B, the blade delivery unit 300 includes a blade carrying portion 310 having a geometry that allows the supported blades 18 to be held firmly and guided into blade slots 202, without damage to the cutting edges 28 of the blades. Thus, there is a clearance C1 in front of each blade that is sufficient to prevent damage to the blade from contact to the tooling if there is vibration when the blade is being delivered to the blade slot. The passages 312, through which the vacuum source 302 is applied, have sufficient diameter D so that the blades 18 are held securely.

In some cases, it may be necessary to provide additional tooling to minimize blade misalignment resulting from vibration of high-speed robotics. Such tooling is commercially available from Hekuma.

Dynamic Razor Cartridges

In the embodiments discussed above, each blade is fixedly mounted, i.e., the blade is not allowed to move (except for the slight axial movement of the terminal ends to prevent warpage of the plastic cartridge or bucking of the blade that is discussed above). The fixed mounting of the blade at its ends provides good stiffness along the entire length of the blade, minimizing or even completely preventing vibration and chatter during shaving. However, if desired, the blade may be allowed to move in a direction generally perpendicular to its length in response to shaving pressure, resulting in a "dynamic" razor cartridge.

Figure 24:
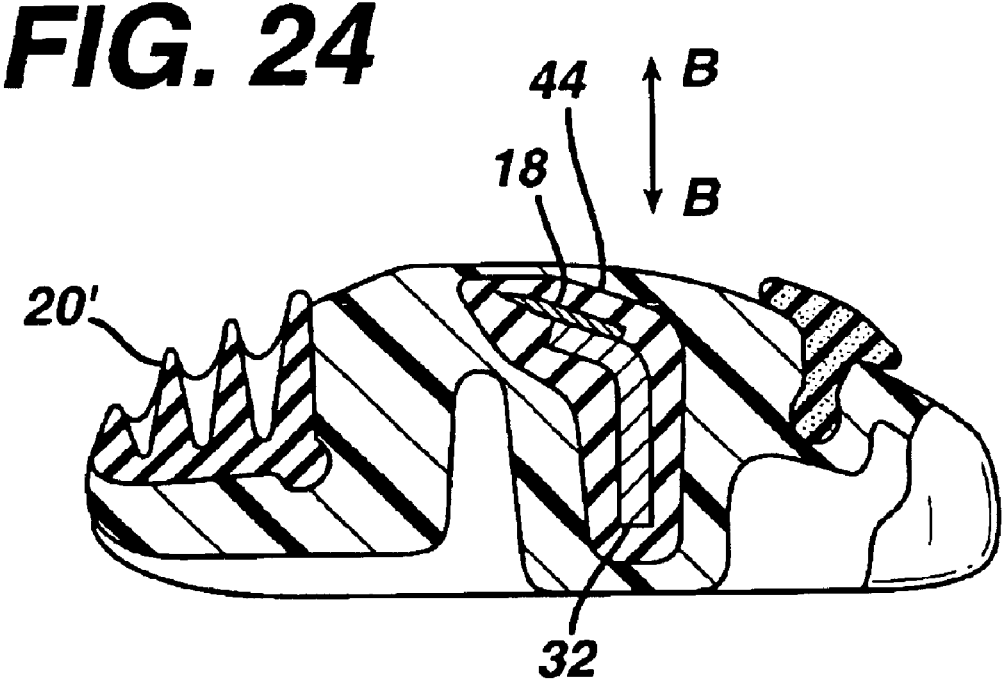
FIG. 24 is a cross-sectional view, similar to FIG. 4, of a razor cartridge according to an alternate embodiment of the invention.

This movement may be accomplished by encapsulating the support ends 64 in a resilient region 44 within the housing 16, as shown in FIG. 24. Resilient region 44 will allow the supported blade to move slightly in a direction generally perpendicular to the length of the blade (arrows B, FIG. 24) in response to shaving pressure. In order to restrict the motion of the supported blade as shown by arrow B, a slot may be molded in the housing to form a guide (not shown). Movement of the blade in the axial direction is minimal.

The resilient region is generally formed of a compliant material, e.g., a thermoplastic elastomer (TPE) such as a styrenic block copolymer. Other suitable compliant materials include silicone elastomers, thermoset rubbers, natural rubbers (latex), butyl rubbers, other materials having similar properties, and blends thereof. Suitable compliant materials are sufficiently compliant to allow a desired amount of blade movement when used in a desired cartridge geometry. In some implementations, the durometer range of the compliant material may be from about 20 to 80 Shore A. It is generally preferred that the blade be allowed to move a total vertical distance (arrows B) of from about 0.10 to 0.20 mm, with movement during shaving typically averaging about 0.1 mm. In general, front-to-back movement of the blade is undesirable. Such movement can be minimized by configuring the resilient region to have a minimal thickness in the horizontal direction, while maximizing thickness in the vertical direction. The amount of blade movement, both vertical and horizontal, will depend on the geometry of the resilient region, as well as the durometer of the compliant material. Including resilient regions results in a blade motion that minimizes unwanted vibration because of the inherent material damping properties of TPEs and similar materials.

It may also be desirable to provide resilient regions that accommodate cartridge shrinkage and thereby prevent warping and/or bucking, as discussed above, without necessarily allowing significant movement of the blade in a direction perpendicular to blade length. In this case, it may be desirable to use a harder compliant material than would be used in a dynamic razor cartridge, and/or to adjust the geometry of the resilient region. If resilient regions are provided to accommodate cartridge shrinkage, it may not be necessary to provide the open areas discussed above for this purpose.

Other Embodiments

Other embodiments are within the scope of the following claims.

For example, while the supported blade has been described as a blade member welded to a support, other types of supported blades may be used. For example, the supported blade may be a single piece of formed material (e.g., bent steel), or may be an assembly of a blade member and a reinforcing member that is joined using any desired technique, e.g., welding, riveting, or adhesive. The blade member and reinforcing member may be of the same material or dissimilar materials.

Figure 25:
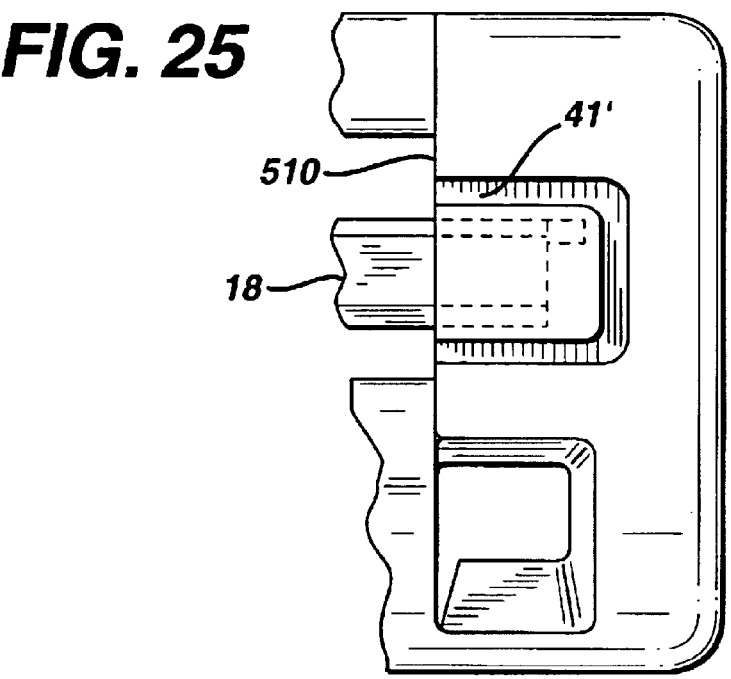
FIG. 25 is a partial top plan view of a razor cartridge according to an alternate embodiment of the invention.
Figure 25A:
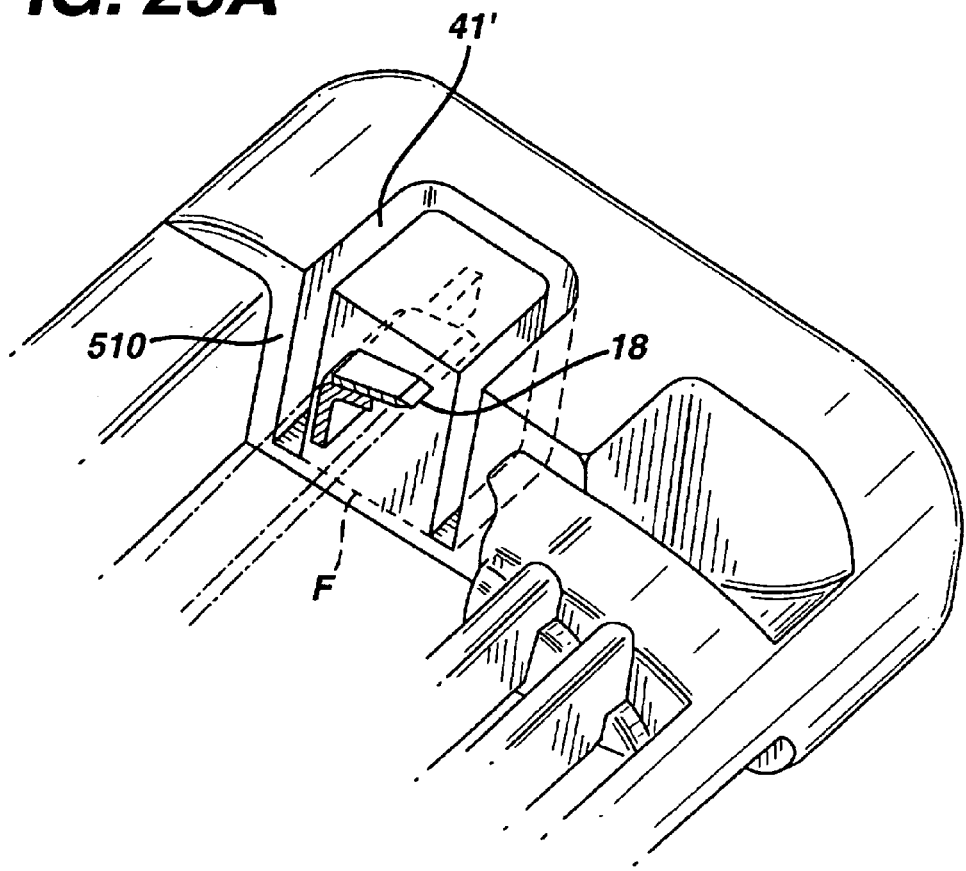
FIG. 25A is a cross-sectional view taken along line A—A in FIG. 25.

Moreover, while in FIG. 1B the flexible regions to accommodate differential shrinkage are provided between the blade ends and housing edge 510, the flexible regions can be provided in other areas, and/or have different geometries. For example, if desired the open areas can be straight, rather than C-shaped. In another embodiment, shown in FIGS. 25 and 25A, a flexible region F' can be provided beneath the blade support. In this case, open area 41' does not extend through the entire thickness of the cartridge, but does extend around the blade end all the way to the housing edge 510. Flexible regions can be provided using other configurations. For example, placement of the flexible region F or F' can cause bowing of the housing to be minimized, or made positive or negative, based on the location of the flexible region relative to other cartridge-specific configurations, as will be appreciated by those skilled in the art.

Moreover, although a magnetic strip and vacuum are described above as ways of holding the blade in place on the mold insert, other techniques may be used. For example, the entire core insert may be magnetized. Alternatively, the blade may be releasably secured to the core insert using any other desired attachment technique that will not damage the blade. Other suitable techniques include mechanical clamping, and combinations of the above-described techniques.

While removable core inserts have been discussed above, in many cases it is desirable to directly load blades into the mold during high-speed manufacturing processes, using robot automation and conventional aligning techniques. In these cases, the mold core includes a portion similar to the core inserts described above, having a blade slot or other blade retention device. In other cases it is desirable to utilize a removable core insert as discussed above. Doing so allows blade loading to be accomplished off-line, which may reduce or eliminate manufacturing delays that are attributable to problems with blade loading. For example, in the case of high cavitation molds (molds with many mold cavities) used to mold multi-blade razor cartridges, it may be more efficient to load the many small blades in an off-line processing step.

Figure 20:
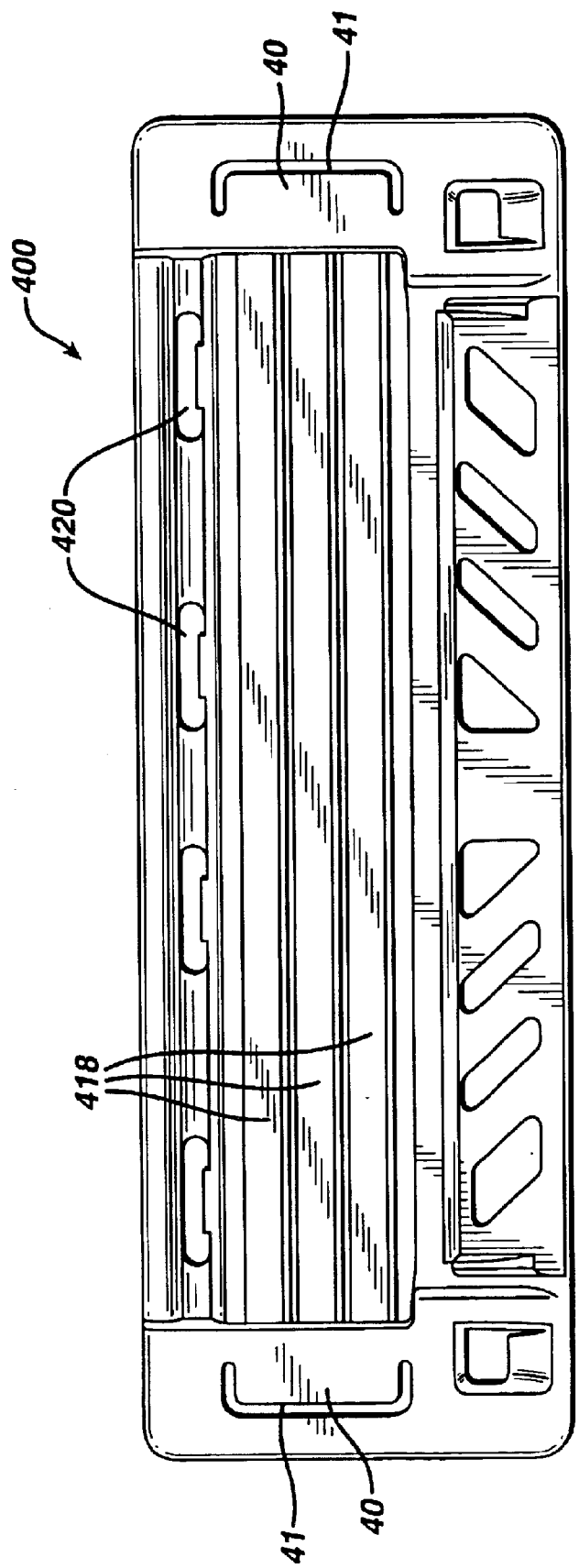
FIG. 20 is a top plan view of a razor cartridge according to an alternate embodiment of the invention.

The cartridge may include more than two blades, if desired. A three-blade cartridge 400 is shown in FIG. 20. Cartridge 400 includes three supported blades 418. The blades 418 are captured at their ends in the manner described above. In this embodiment, the guard has been omitted, to provide room for three blades without making the cartridge seem overly large. Open slots 420 can receive an elastomeric shaving aid strip, if desired. Openings 422, in what would generally be the guard area, may be left open to provide flushing, or may receive a separate guard, e.g., an elastomeric material insert molded onto the cartridge, if desired.

Substantially the entire length of the shaving area of the blade may be unsupported by the plastic of the cartridge, as shown and discussed above. Alternatively, if desired, portions of the shaving area of the blade may be supported by the housing. Generally, it is preferred that at least 50% of the shaving area of the blade be unsupported, more preferably at least 75%.

Also, the blade support can be made without the support ends 64, in which case the ends of the supported blade are captured.

While the resilient regions have been shown as surrounding the blade ends, alternatively resilient regions may be positioned beneath or above the blade ends.

What is claimed is:

1. A method of manufacturing a razor cartridge including a molded housing and a supported blade mounted in the housing, comprising:

loading a support portion of the supported blade into an elongated blade slot defined by a core member, the core member being configured to define a portion of a molding cavity, mold surfaces of the molding cavity defining the shape of the housing; and delivering a resin to the molding cavity to form the housing and capture a portion of the blade in the resin.

2. The method of claim 1 wherein the blade slot includes a lead-in area configured to facilitate loading of the blade into the blade slot.

3. The method of claim 1 wherein the resin-delivering step comprises capturing the ends of the blade in plastic.

4. The method of claim 2 wherein the lead-in area comprises angled regions on the sides of the blade slot.

5. The method of claim 4 wherein the lead-in area further comprises angled regions on the ends of the blade slot.

6. The method of claim 2 wherein the lead-in area, when viewed from above the blade slot, has a generally bowed shape to accommodate bowing of the blade.

7. The method of claim 4 wherein the blade slot includes a lower portion having substantially vertical sides, configured to position the blade.

8. The method of claim 1 wherein the delivering step comprises delivering a plurality of resins to the molding cavity, each resin forming a portion of the housing.

9. The method of claim 8 wherein at least one of the resins comprises a compliant material.

10. The method of claim 1 further comprising retaining the blade support in the blade slot by a retention means selected from the group consisting of vacuum, magnetic, and mechanical means.

11. The method of claim 1 further comprising delivering the supported blade to the blade slot using a vacuum transfer device.

12. The method of claim 1 further comprising providing clearance areas in the molding cavity, configured so that the mold surfaces will not contact an edge portion of the supported blade in shaving areas of the blade.

13. The method of claim 1 further comprising providing contact areas in the molding cavity, configured so that the mold surfaces will close on the supported blade in non-shaving areas adjacent the ends of the blade, inboard of the blade ends.

14. The method of claim 1 further comprising providing coring areas in the molding cavity beyond each of the blade ends, configured to provide a flexible region of plastic adjacent each blade end in the finished product.

15. The method of claim 1 wherein the core member is removable from the molding cavity.

16. The method of claim 15 further comprising inserting the core member into the molding cavity.

17. The method of claim 16 wherein the supported blade is loaded into the core member prior to insertion of the core member into the molding cavity.

18. The method of claim 1 wherein the cartridge includes a plurality of blades, and the core member defines a corresponding number of elongated blade slots.

19. A method of manufacturing a plurality of razor cartridges substantially simultaneously, each cartridge including a molded housing and a blade mounted in the housing, comprising:

(a) removably mounting each blade on a core member;

(b) placing each core member in a molding cavity; and (c) delivering a resin to the molding cavities to form at least a portion of the housing and capture a portion of the blade in the resin.

20. The method of claim 19 wherein step (a) is performed at a first station and steps (b) and (c) are performed at a second station.

21. The method of claim 20 further comprising placing each core member in a molding cavity at a third station and delivering a second resin to the molding cavity to form a second portion of the housing.

22. The method of claim 21 wherein at least one of the resins is a compliant material.

23. The method of claim 19 wherein each cartridge includes a plurality of blades, and step (a) includes mounting the plurality of blades on a single core member.

24. The method of claim 23 wherein the core member defines a plurality of elongated blade slots.

25. The method of claim 24 wherein step (a) includes loading the blades into the blade slots using vacuum transfer.

26. A method of manufacturing a razor cartridge including a molded housing and a blade mounted in the housing, comprising:

loading the blade into a molding cavity;

delivering a compliant material to the molding cavity to capture at least the ends of the blade in the resin;

placing the blade and molded compliant material in a second molding cavity, the second molding cavity defining the shape of the molded housing; and delivering a resin to the second molding cavity to form the molded housing.

27. A method of manufacturing a razor cartridge including a molded housing and a supported blade mounted in the housing, comprising:

loading the supported blade into a molding cavity, mold surfaces of the molding cavity defining the shape of the housing;

providing coring areas in the molding cavity beyond each of the blade ends, configured to provide a flexible region of plastic adjacent each blade end in the finished product; and delivering a resin to the molding cavity to form the housing and capture the ends of the blade in the resin.

28. A method of manufacturing a razor cartridge including a molded housing and a supported blade mounted in the housing, comprising:

loading the supported blade into a molding cavity, the supported blade having blade ends, mold surfaces of the molding cavity defining the shape of the housing; and delivering a resin to the molding cavity to form the housing and capture the ends of the blade in the resin;

wherein the resin is delivered through a gate that is positioned so that a substantial portion of the resin flow goes by the blade ends before the molding cavity is filled.

29. The method of claim 28 wherein the gate is substantially centrally positioned in the molding cavity in the direction of the length of the blade.

30. The method of claim 26, 27 or 28 wherein the cartridge includes a plurality of blades, and the loading step includes loading the plurality of blades.

* * * * *